United States Patent [19]
Maeda

[11] Patent Number: 4,561,029
[45] Date of Patent: Dec. 24, 1985

[54] MAGNETIC RECORDING AND/OR REPRODUCING APPARATUS OF THE CASSETTE TYPE

[75] Inventor: Masaya Maeda, Kanagawa, Japan

[73] Assignee: Canon Kabushiki Kaisha, Tokyo, Japan

[21] Appl. No.: 563,005

[22] Filed: Dec. 19, 1983

Related U.S. Application Data

[63] Continuation of Ser. No. 282,077, Jul. 10, 1981, abandoned.

[30] Foreign Application Priority Data

| Jul. 14, 1980 | [JP] | Japan | 55-95949 |
| Jul. 14, 1980 | [JP] | Japan | 55-95950 |
| Jul. 14, 1980 | [JP] | Japan | 55-95951 |

[51] Int. Cl.⁴ .............................................. G11B 15/00
[52] U.S. Cl. ........................................ 360/85; 360/93; 360/95
[58] Field of Search ................... 360/83–85, 360/90, 92, 93, 95, 96.1, 96.3

[56] References Cited

U.S. PATENT DOCUMENTS

| 3,821,805 | 6/1974 | Serizawa | 360/85 |
| 4,213,162 | 7/1980 | Lemelson | 360/85 |
| 4,258,399 | 3/1981 | Iijima et al. | 360/85 |
| 4,369,473 | 1/1983 | Eibensteiner | 360/85 |

Primary Examiner—Robert L. Richardson
Attorney, Agent, or Firm—Toren, McGeady, Stanger, Goldberg & Kiel

[57] ABSTRACT

In a magnetic recording and/or reproducing apparatus of the cassette type which is adapted to employ a small-sized tape cassette, the magnetic tape in the cassette is extracted to be wrapped about and from the both sides of a guide drum to a predetermined angular extent by means of a pair of extracting means. The extracting means have a vertical pin and an inclined pin arranged rotatably about the vertical pin in order that such means may travel in a restricted space of the apparatus. After achievement of the extraction of the tape, the inclined pin is adapted to rotate in such a direction that the tape is further wrapped around the guide drum, so that the tape loading is achieved. A pinch roller is so provided that it travels on the same path as the extracting means at least from the starting position to the predetermined position also in such restricted space. When the extracting means return to the initial position, in order to prevent the slack of the tape, a driving mechanism for the fast forward and rewind is utilized to wind speedily the tape.

22 Claims, 11 Drawing Figures

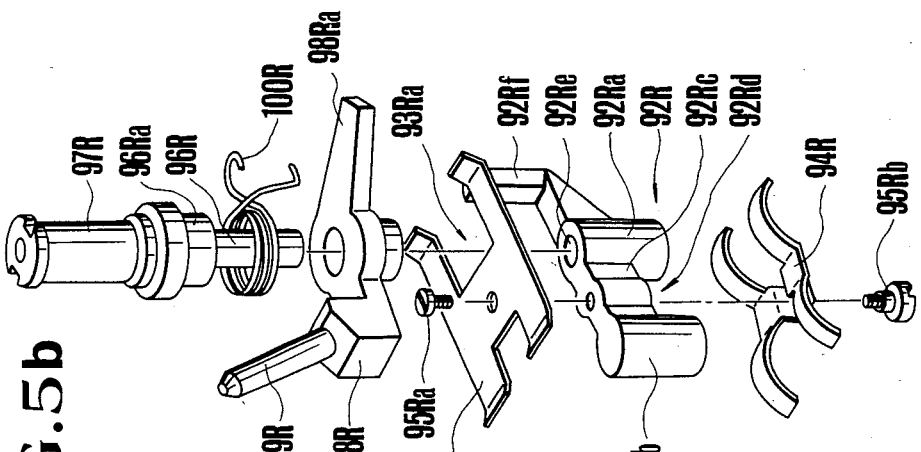
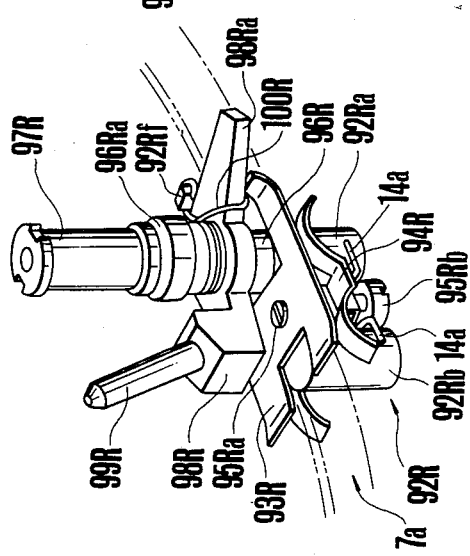
FIG. 5b
FIG. 5a

MAGNETIC RECORDING AND/OR REPRODUCING APPARATUS OF THE CASSETTE TYPE

This application is a continuation of application Ser. No. 282,077, filed 7-10-81 and now abandoned.

BACKGROUND OF THE INVENTION

1. Field of the Invention

This invention relates to a magnetic recording and/or reproducing apparatus of the cassette type and, more particularly, to a tape transport system for use in such an apparatus.

2. Description of the Prior Art

Recently a magnetic recording and/or reproducing apparatus which employs a magnetic tape cassette for making a recording and/or reproduction of optical images (hereinafter called as a cassette type VTR) has a tendency to make it small, particularly a guide drum having a rotating magnetic head for recording and/or reproducing and a tape cassette are made to have a small size.

Heretofore, as a cassette type VTR of 2 head-helical-scanning type, such system has been known that a pair of tape extracting means are positioned at an inside of a tape within a cassette as said cassette is loaded, and said pair of tape extracting means are made to proceed from said position to outside of said cassette in a parallel manner sandwiching the guide drum so that the tape is wrapped about the guide drum in a tightly contacting manner, and at a time of loading the cassette a pinch roller is made to pressure contact with a capstan positioned inside the tape within said cassette from outside of the cassette sandwitching the tape therebetween for driving the tape to run the same within the cassette. And since a cassette type VTR with said kind of system has an arrangement that a capstan is made to proceed into a cassette as the cassette is loaded for driving the tape to run the same within the cassette, unless a width in a lengthwise direction of the cassette is made sufficiently large compared to a diameter of a guide drum, the driving of the tape to run the same will be very difficult thus it is apparently disadvantageous in making a size of a cassette small, therefore, it is difficult to make a size of a total apparatus small due to a size of the cassette.

On the other hand, as a cassette type VTR of a 2-head-helical-scanning type, such system has been known to date beside the above-mentioned system that tape extracting means and a pinch roller are positioned at an inside of a tape within a cassette as the cassette is loaded and said tape extracting means and pinch roller are integrally shifted in a rotating manner around a guide drum from said position so that the tape is wrapped about the guide drum in a tightly contacting manner and the pinch roller is made to pressure contact with the capstan placed near said tape loading position sandwiching the tape therebetween at the tape loading position thus driving the tape to run the same. And in this latter type of cassette VTR, the above-mentioned disadvantages seen in the former type of cassette VTR are eliminated, but on the other hand since the latter type has an arrangement that a space between the cassette and the guide drum is apt to become large and at the same time, the pinch roller is rotatingly shifted around the guide drum together with the tape extracting means to the tape loading position, a sufficient space for shifting of the pinch roller has to be secured around the guide drum. Therefore, a space around the guide drum increases which is apparently disadvantageous for making a size of a total apparatus small. Thus, even if the special feature of said former type of cassette VTR and that of the latter type of cassette VTR are combined, an object of making a size of a cassette and that of a total apparatus small has been quite difficult to be achieved.

Further, in the former type of 2-head-helical-scanning VTR, a pin about vertical relatively against a cassette supporting plane (base plate) and a relatively inclined pin provided on a pair of tape extracting means are positioned at an inside of a tape within a cassette as the cassette is loaded and said pair of tape extracting means are shifted from said state to outside of the cassette so that the tape is pulled out of the cassette in about parallel manner against said cassette supporting plane, further said pair of tape extracting means are made to proceed in a parallel manner sandwiching a guide drum which has a pair of recording and/or reproducing magnetic heads facing to each other in 180 degree and are so provided as being relatively inclined with a prescribed angle against the cassette supporting plane, so that the tape being pulled out is wrapped about an outer circumference of the guide drum in a tightly contacting manner for an extent of 180 degree or more in an about parallel manner against the cassette supporting plane for making a recording and/or reproducing of optical images. And these conventionally known types of a cassette VTR has such an arrangement that the vertical pin and the inclined pin at the tape extracting means have their relative positions so fixed on a base plate of the extracting means that the inclined pin is always positioned at the guide drum side, while the vertical pin is positioned at an outside, and the vertical pin and the inclined pin are shifted at a time of tape loading and tape unloading in such parallel manner that their relative positional relationship on said base plate are unchanged. Therefore, in a cassette VTR with such arrangement since a vertical pin and an inclined pin are shifted together in a parallel manner, a relatively large space is needed around a guide drum for shifting of tape extracting means, therefore, it is apparently disadvantageous for making a size of an apparatus small. That is, in general, a total width erasing head, and an audio signal and control signal recording and/or reproducing head, etc. are fixedly positioned near a guide drum, and tape extracting means are shifted between the guide drum and said fixed heads, and in order to secure a sufficient space for shifting of the tape extracting means said fixed heads must be positioned with a large distance from the guide drum, thus it is disadvantageous for making a size of an apparatus small. Especially, conventionally known type of cassette VTR of said kind is so made that a positional control of the tape extracting means is not so extensively made during a shifting of said extracting means and the tape extracting means are caught by catching means at a tape loading position thereby making exact positioning of the same. Therefore, said tape extracting means apt to become unstable in a shifting process before it reaches a tape loading position, thus a space for its shifting needs to be that much larger.

Also generally speaking in a magnetic recording and/or reproducing apparatus using a cassette type tape for recording and/or reproducing optical images, a tape is pulled out of a loaded tape cassette by tape extracting means and is sent to a guide drum having a rotating magnetic head for recording and/or reproducing optical images thus making a recording and/or reproduction of optical images. Therefore, it is necessary that as the cassette is taken out while the tape extracting means are returned to a direction of the cassette the tape is returned to within the cassette absorbing a sag or a slack of the tape generated by a change in a tape running path at this time (that is unloading). And for that what has been done hitherto is that independent rotating means which is used solely to absorb the sag or slack of the tape at said tape unloading are provided and a tape reel is driven by said rotating means for absorbing the sag or slack of the tape at the time of tape unloading, or a driving system for fast forwarding of tape or for quick rewinding of tape which is provided at almost all types of apparatus of this kind is activated also at the time of tape unloading so that the tape reel is driven by said high speed running drive system for absorbing the sag or slack of the tape at the time of tape unloading.

Now, as said two different types of methods are compared, an additional element such as independent rotating means which is used solely for absorbing the sag or slack of the tape in tape unloading is not necessary in the latter method, therefore number of components will be less and an arrangement of a reel driving system is simplified. But, while it has said advantages the same method has disadvantages that the tape reel is driven at the time of tape unloading in a same manner as in a high speed running drive of tape as in fast forwarding or quick rewinding of the tape, therefore a taking up torque of the tape reel becomes excessively large and its taking up speed will be remarkably high compared to a speed of growing of the sag or slack of the tape along with a return of the tape extracting means to the tape unloading position, causing large stress on the tape.

In order to eliminate said disadvantages for example, reduction gear means are provided in a high speed tape running drive mechanism mentioned above or its driving motor is run with a reduced speed and the like can be conceived. But in any event it creates complication of an arrangement of a reel driving mechanism or complication of an arrangement of a motor control circuit, which is disadvantageous in making a size of apparatus small.

SUMMARY OF THE INVENTION

It is accordingly, an object of the present invention to provide a magnetic recording and/or reproducing apparatus of the cassette type which obviates the disadvantages of prior art devices.

It is another object of the present invention to provide a magnetic recording and/or reproducing apparatus of the cassette type, wherein a tape transport mechanism is simple in construction or a restricted space in the apparatus is effectively utilized, so that the apparatus can be made small-sized.

It is yet another object of the present invention to provide a magnetic recording and/or reproducing apparatus of the cassette type which is very useful in making a size of the cassette small also in making a size of a total apparatus small for the magnetic recording and/or reproducing apparatus which makes recording and/or reproduction of optical images using such cassette type tape, further a satisfactory driving for running tape can be made without causing undue stress or other difficulties, and a magnetic recording and/or reproducing apparatus of the present invention with said objects is characterized by that a tape running capstan is positioned outside the cassette and a pinch roller together with tape extracting means are positioned inside the tape within a cassette in a state prior to extraction of the tape and said pinch roller is shifted along a guide path which is common for the tape extracting means as the tape is pulled out, and at the same time said guide path is made to diverge into a path for the tape extracting means only and a different path for the pinch roller only at a position between a position corresponding to a tape unloading and a position corresponding to tape loading and after said diverging point said tape extracting means are shifted along said path for the tape extracting means only for wrapping the tape about a guide drum in a tightly contacting manner, also said pinch roller is shifted along said path for the pinch roller only for making it to face the capstan being positioned at an outside of the cassette at a position being at the end of said shifting.

It is further object of the present invention to provide a magnetic recording and/or reproducing apparatus of a cassette type in which a space around a guide drum being needed for shifting of tape extracting means can be made small and by this various elements such as fixed heads, etc. which should be positioned near the guide drum can be placed near the guide drum, thus a size of total apparatus can be effectively made small, and a magnetic recording and/or reproducing apparatus of the present invention having an arrangement prescribed in the beginning of this summary with the above object is characterized by that the above-mentioned inclined pin is supported in a relatively rotatable manner about the vertical pin, and said inclined pin is so positioned until the tape extracting means reach the tape loading position as being generally parallel to a shifting path of the tape extracting means relatively against the vertical pin, and the inclined pin is rotated to a guide drum side at the tape loading position relatively against the vertical pin so that it comes generally along with the guide drum.

Also, a preferred embodiment of the present invention for characterizing arrangements thereof, which is to be explained hereinafter, discloses a set up that the above-mentioned inclined pin is supported by a rotatable supporting member in a relatively rotatable manner against said vertical pin and at the same time, said supporting member is biased by a spring member to a prescribed direction until its position is restricted, so that the inclined pin is so positioned as approximately coming along a shifting path of the above-mentioned tape extracting means relatively against the vertical pin until the tape extracting means reach the tape loading position, then a part of the supporting member is made to engage with an engaging member at the tape loading position for rotating the same against said spring member, thus rotating the inclined pin to the guide drum side relatively against the vertical pin, also at this time the engaging position of the engaging member is made adjustable so that an adjustment of rotating position of the inclined pin can be made by an adjustment of the engaging position thereof. And this set up is very advantageous in respect to the following points:

That is, generally speaking the inclined pin needs a very fine adjustment at the loading position for an adjustment of an angle of the tape as it is wrapped about the guide drum in a tightly contacting manner and for an adjustment of running of the tape against the tape reel at the external circumference of the guide drum, etc. And for this purpose a conventional apparatus uses such method that the inclined pin is directly adjusted at the loading position in a reproducing state of optical images, while reproduced optical images are being observed, therefore operations thereof are complicated and there are such fears that the running tape is touched or is damaged or an unexpected injury is sustained by an operator. But, contrary to this, in the set up disclosed by the above-mentioned embodiment such advantages can be obtained that said fears are completely eliminated and operations can be made easily, further the above-mentioned fine adjustment of the isolated pin can be made in a safe and reliable manner.

It is further object of the invention to provide a magnetic recording and/or reproducing apparatus of a cassette tape wherein at least two kinds of running paths of a magnetic tape are provided and a slack of tape generated by a change in said running path as the running path is changed from a long running path to a short running path is absorbed by using a high speed running drive system for fast forwarding or backwarding (quick return) of a tape, thus said absorbing of the slack of the tape accompanied by a change in the running path of the tape can be done without any undue stress on the tape yet the complication in an arrangement of the reel driving mechanism or the complication of an arrangement of the control circuit for the driving motor thereof as mentioned above can be completely eliminated, and a magnetic recording and/or reproducing apparatus of the present invention with the above-mentioned object has characterizing features that the apparatus has at least two kinds of running paths of the magnetic tape and a rotating body for high speed running of tape is made to pressure contact with a rotating body for tape reel driving in a state the magnetic tape is in one of the running path for rotating said rotating body for driving the tape reel, thus making a high speed driving of the magnetic tape, also at a time when the running path of the magnetic tape is changed from the long path to the short path the rotating body for high speed running of tape is made to pressure contact with the rotating body for driving tape reel for rotating said rotating body for driving tape reel thus absorbing the slack of tape generated by the change in the running path at this time, and at the same time the pressure contacting power of the rotating body for high speed running of tape against the rotating body for driving tape reel is made weaker than the pressure contacting power at the time of the driving tape with high speed.

These and further objects and features of the invention will become apparent from the following detailed description of embodiments thereof taken in connection with the accompanying drawings.

BRIEF DESCRIPTION OF THE DRAWINGS

FIG. 5 is an oblique view to show details of an arrangement of tape extracting means at right side, wherein (a) shows a state after assembling while (b) shows a state as broken down.

DESCRIPTION OF THE PREFERRED EMBODIMENT

Now an example of the present invention will be explained referring to the accompanying drawings.

Figure 1:
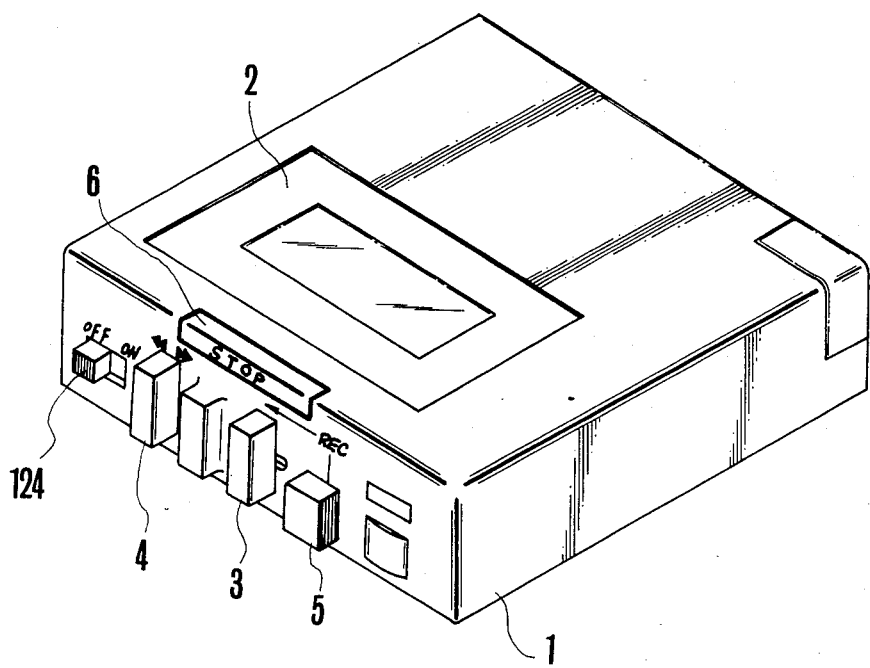
FIG. 1 is an oblique view showing an external appearance of total body of the apparatus as an example of the present invention.

First, FIG. 1 shows an external appearance of a magnetic recording and/or reproducing apparatus according to the present invention, wherein 1 is a main body cover, 2 is a tape cassette housing part, 3 is a play key, 4 is an operating key for fast forwarding and backwarding of a tape, in which a fast forwarding of tape is done by operating the key to right side while a fast backwarding is done by operating the same to left side. What is shown as 5 is a recording button, 6 is a stop button and 124 is a power source switch operating lever.

Figure 2:
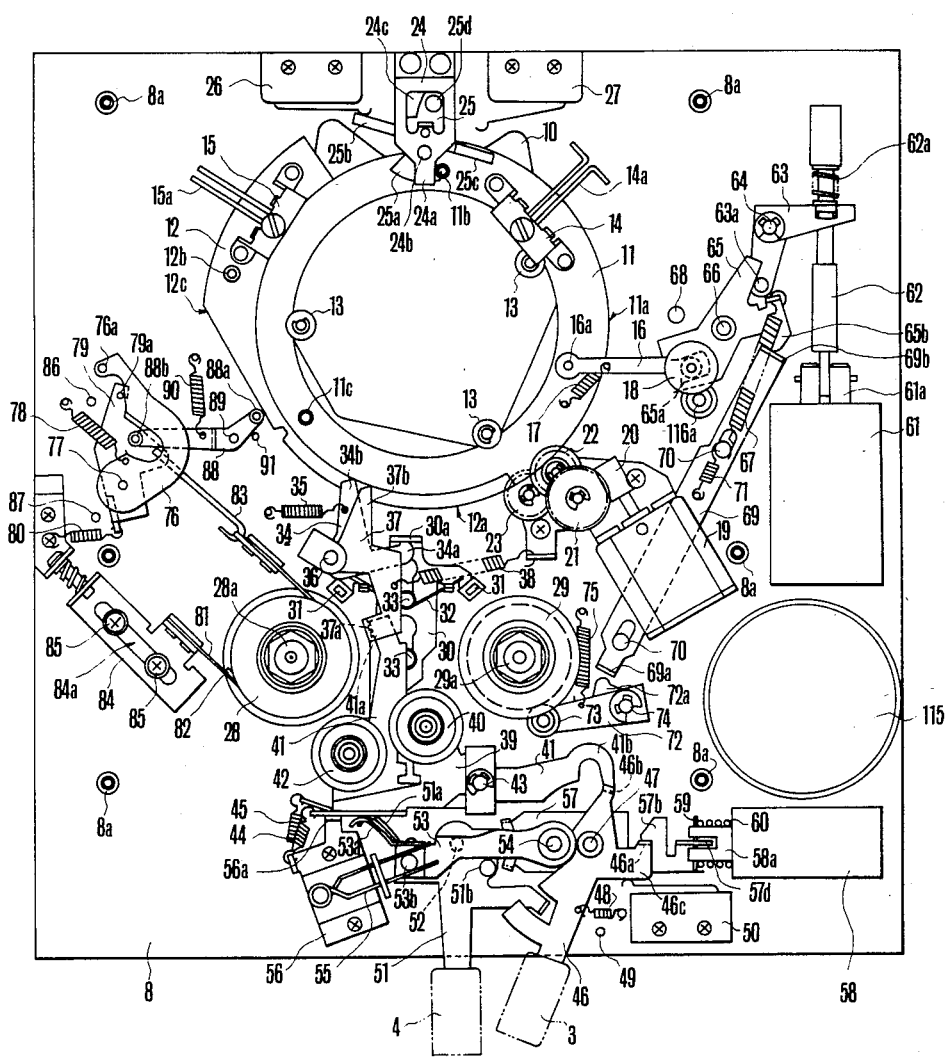
FIG. 2 is a mechanical drawing to show details of internal mechanism of the apparatus shown in FIG. 1 in a state wherein a tape guide drum and an intermediate base plate are removed, in which the drawing corresponds to a state a recording or reproducing is being done.
Figure 3:
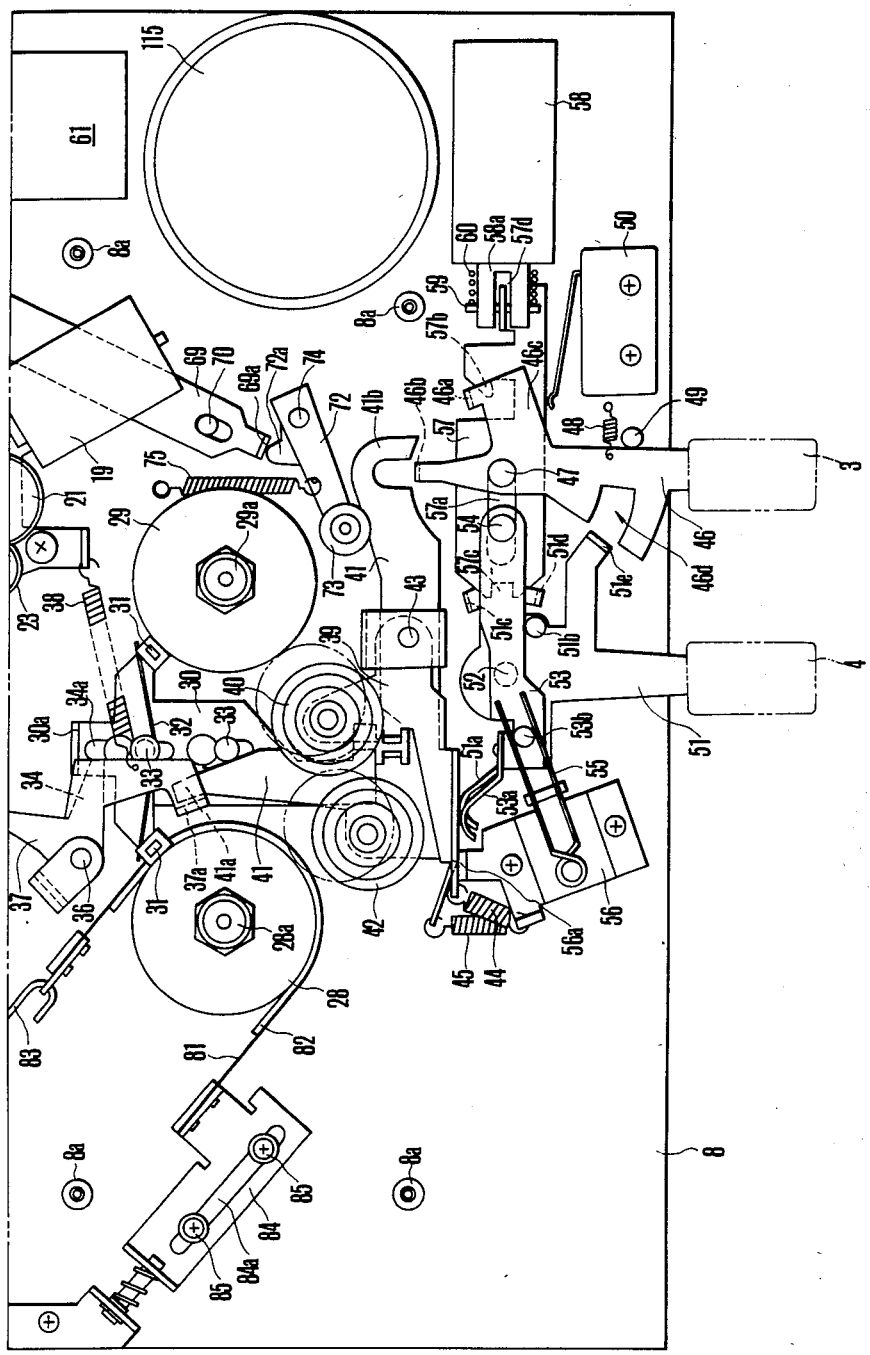
FIG. 3 is an enlarged drawing for an important part of the set up shown in FIG. 2, especially around an operating system, wherein the drawing corresponds to a stopped state.

Next, details of internal structure of said apparatus will be explained. First, FIG. 2 and FIG. 3 show details of the internal mechanism in a state an intermediate base plate and a tape guide drum are removed (especially FIG. 3 chiefly shows details of operating parts), in which 8 is a horizontal base plate of the apparatus, 10 is a tape guide drum supporting stand fixed on said base plate 8, wherein a tape guide drum 9 having recording and/or reproducing magnetic heads facing to each other in 180 degree positions provided thereon is fixed on said supporting stand 10 in a state being slanted with a prescribed angle as will be described later (refer to FIG. 4 and FIG. 8). What are shown as 11 and 12 are tape loading rings being so supported as being rotatable around the guide drum by supporting rollers 13 suitably provided at three places on the guide drum supporting stand 10. The loading ring 11 fixedly supports a spring supporting stand 14 supporting a spring piece 14a engaging with a base stand of a tape extracting member to be described later, and at the same time, further rotatably supports a pinch roller arm 16 which rotatably supports a pinch roller 18 at a forward end thereof by a shaft 16a, further said pinch roller arm 16 is rotatingly biased to a clockwise direction by a spring 17.

On the other hand, the loading ring 12 fixedly supports a spring supporting stand 15 which supports a spring piece 15a engaging with a base stand of another tape extracting member to be described later likewise. Further, these loading rings 11 and 12 have gear parts 11a and 12a at a part of their respective outer circumference and are rotatingly driven to respectively opposite directions through said gear parts 11a and 12a by a loading gear 22, which is reducely driven by a loading motor 19 through a worm gear 20, a worm wheel 21, etc. and by a loading gear 23 which is coupled thereto. What is shown as 24 is a stopper arm fixed on the base plate 8 and a loading restricting pin 11b and an unloading restricting pin 11c planted on the loading ring 11 come in contact with a stopper part 24a of the stopper arm 24 at a prescribed rotating position of the loading ring 11 as a tape loading and a tape unloading are done respectively, thereby restricting a rotating extent of the loading rings 11 and 12.

What is shown as 25 is a switch put in lever being axially supported in a freely rotatable manner by a planted pin 24b of the stopper arm 24, and is rotated to a clockwise direction and a counterclockwise direction through a sector part 25a thereof as each of the loading restricting pin 11b and the loading restricting pin 11c on the loading ring 11 comes in contact with the stopper part 24a of the stopper arm 24, and at this time a loading completion detecting switch 26 is put in at a time the loading is completed and an unloading completion detecting switch 27 is put in at a time the unloading is completed respectively by switch operating arms 25b and 25c thereof.

Also a rotating extent of the switch put in lever 25 at this time is restricted within a prescribed angle as a pin 25d thereof is positioned within an opened part 24c of the stopper arm 24, and is retained at a neutral position by functional power of elastic pieces of the switches 26 and 27 in an intermediate state before the pins 11b and 11c come in contact with the stopper part 24a. What is shown as 28 is a tape feeding reel stand, and 29 is a tape take up reel stand, both of which are axially supported on the base plate 8 in a rotatable manner. What is shown as 30 is a reel stand brake sliding plate and is supported in an up and down slidable manner by a pin 33 planted on the base plate 8 and is biased downward by a spring 32, wherein brake pads 31 consisting of elastic member such as rubber, etc. attached to a forward end of arms extended to left and right directions come in contact with the external circumferences of the reel stands 28 and 29 at its position being slided downwards thereby braking both reel stands 28 and 29. What is shown as 34 is a brake control lever and is axially supported by a shaft 36 planted on the base plate 8 in a rotatable manner and at the same time is rotatingly biased to a counterclockwise direction by a spring 35, thus the brake sliding plate 30 is slided upward resisting a spring 32 through a bent part 30a thereof by said counterclockwise rotation, thereby releasing a pressure contact of the brake pads 31 against the reel stands 28 and 29, thus releasing the braking for the reel stands 28 and 29. Also as the loading rings 11 and 12 return from the loading position to the unloading position, a control pin 12b on the loading ring 12 comes in contact with an extruded arm 34b at the unloading completion position that is a position at which the unloading restricting pin 11c on the loading ring 11 comes in contact with the stopper part 24a of the stopper arm 24, thereby rotating the lever 34 to a clockwise direction resisting a spring 35, releasing a checking of the bent part 30a of the brake sliding plate 30 by a control arm 34a thereof, and said brake sliding plate 30 slides downwards by an action of the spring 32 as the checking by the braking controlling lever 34 is released to have the brake pad 31 pressure contact with external circumferences of both reel stands 28 and 29, thus braking said both reel stands 28 and 29.

What is shown as 37 is a control lever for absorbing a slack of the tape at the time of unloading and is axially supported by the shaft 36 in a rotatable manner, and at the same time is rotatingly biased by a spring 38 to a counterclockwise direction.

And said slack absorbing control lever 37 is rotated to a clockwise direction resisting the spring 38 as its extending arm 37b is pressed together with the brake control lever 34 by the control pin 12b on the loading ring 12. When the loading rings 11 and 12 return from the loading position to the unloading position, and details of its function will be described later. What is shown as 39 is a fast forwarding roller stand supporting a tape fast forwarding roller 40 in a rotatable manner, and 41 is a fast backwarding (quick return) roller stand supporting a tape fast backwarding roller 42 in a freely rotatable manner, wherein these roller stands 39 and 41 are axially supported by a common shaft 43 on the base plate 8 in a rotatable manner and are rotatingly biased to a counterclockwise direction by springs 44 and 45 respectively. Said fast forwarding roller 40 is usually rotatingly driven to a counterclockwise direction together with a capstan 116a by a capstan motor 115 through a mechanism to be described later, and the fast forwarding roller stands 39 is rotated to a clockwise direction resisting a spring 44 through an arrangement to be described later by operating the operating key 4 to right side and the fast forwarding roller 40 is made to pressure contact with the external circumstance of the take up reel stand 29, thereby said reel stand 29 is rotated with high speed to a clockwise direction, thus making a fast forwarding of the tape. Also, the fast backwarding roller stand 41 is rotated resisting a spring 45 through an arrangement to be described later by operating the operating key 4 to left side under a state the fast forwarding roller 40 is in a non-contacting position with the take up reel stand 29 being shown in the drawing, and the fast backwarding roller 42 is made to pressure contact with the external circumferences of both of the fast forwarding roller 40 and the tape feeding reel stand 28, thereby having the reel stand 28 make a high speed rotation to a counterclockwise direction, thus making a fast backwarding of the tape.

Also, as will be described later, as the fast backwarding roller stand 41 is rotated to a clockwise direction resisting the spring 45 through an engagement of the bent part 37a at a forward end of the tape slack absorbing control lever 37 with a forward end part 41a thereof by functional power of a spring 38 spanned on the lever 37, as will be described later the fast backwarding roller 42 will be made to pressure contact with external circumferences of the fast forwarding roller 40 and the feeding reel stand 28 with a relatively weak pressure contacting power by the spring 38 also at the time of tape unloading, thereby affording taking up torque being weaker than that at the time of fast backwarding of tape to the feeding reel stand 28, thus the slack of the tape at the time of tape unloading is absorbed.

What is shown as 46 is a play lever operated by the play key 3 and is axially supported by a shaft 47 in a rotatable manner and at the same time is rotatingly biased to a counterclockwise direction by a spring 48, further the lever 46 has an engaging part 46a which engages with a play lever checking part 57b of a checking lever 57 as the lever 46 is rotated to a clockwise direction resisting the spring 48 at the time of play mode (and of a recording mode), and has a bent part 46b which is to prevent a clockwise rotation of the fast backwarding roller stand 41 by the spring 38 spanned on the control lever 37 as the lever 46 comes in contact with a forward end of an arc shape hook part 41b at a tail end of said roller stand 41, that is to prevent the pressure contact of the fast backwarding roller 42 against the fast forwarding roller 40 and the feeding reel stand 28. What is shown as 49 is a position restricting stopper pin against a counterclockwise rotation of the play lever 46, and what is shown as 50 is a play switch which is made to be put in through its switch put in arm 46c as the play lever 46 is rotated to clockwise direction. What is shown as 51 is a fast forwarding and backwarding lever operated by the operating key 4, and is axially supported by a shaft 52 in a rotatable manner. Said lever 51 has a roller stand pressing spring piece 51a which presses the bent part of the fast backwarding roller stand 41 as the lever 51 is rotated to a clockwise direction by operating the operating key 4 to left side that is by the tape fast backwarding operation, thereby rotating the roller stand 41 to a clockwise direction resisting the spring 45, for having the fast forwarding roller 42 pressure contact with the fast forwarding roller 40 and the feeding reel stand 28, and a pin 51b, which rotates the fast forwarding lever 53, axially supported by a shaft 54 in a rotatable manner to a clockwise direction from a neutral position resisting a neutral retention spring 55 which sandwiches a pin 53b thereof, as the lever 51 is rotated to a counterclockwise direction by operating the operating key 4 to right side that is by the tape fast forwarding operation, and rotates the fast forwarding roller stand 39 to clockwise direction by the roller stand pressing spring piece 53a which is provided at a forward end thereof and is to press the bent part of the fast forwarding roller stand 39, thereby making the fast forwarding roller 40 pressure contact with the take up reel stand 29, further has engaging parts 51c and 51d, which engage with a lever checking part 57c at a forward end of the checking lever 57 as the lever 51 is rotated to a clockwise direction and a counterclockwise direction by said tape fast backwarding operation and tape fast forwarding operation (shown in FIG. 3).

What is shown as 56 is a spring supporting stand to support the neutral retention spring 55 for the fast forwarding lever 53 and is so made that the counterclockwise rotation of the both roller stands 39 and 41 is restricted by a bent part 56a thereof. Here, the abovementioned lever 51 further has a bent part 51e at a forward end of its extended arm at right side, and against this, the play lever 46 has a notch part 46d for receiving said bent part 51e as the lever 46 rotates to a clockwise direction under a state the lever 51 is at a neutral position, therefore said engagement of the notch part 46d and the bent part 51e prohibits the rotation of the lever 51 hence the operation of the key 4 under a state the play lever 46 is rotated to a clockwise direction while the lever 51 is at a neutral position as shown in FIG. 2, that is under a play mode state or a recording mode state. Also, under a state the play lever 46 is rotated to a counterclockwise direction until it comes in abut to the stopper pin 49 by an action of the spring 48, the bent part 46b of the lever 46 just faces to a notch part of the arc shape hook part 41b at the tail end of the fast backwarding roller stand 41 as shown in FIG. 3, therefore only when the lever 46 is at its position shown in FIG. 3 the rotation of the lever 46 to a clockwise direction is possible that is the pressure contact of the fast backwarding roller 42 with the fast forwarding roller 40 and the feeding reel stand 28 is possible. The above-mentioned check lever 57 is supported slidably to left and right in the drawing by an engagement of a long hole 57a thereof with the shafts 47 and 54 as shown in detail in FIG. 3, and at the same time it is coupled to an armature rod 58a of a shut off solenoid 58 at a bent part 57d at its tail end by a coupling pin 59, further it is biased to left side together with the armature rod 58a by a spring 60 provided at the rod 58a, thus when the play lever 46 is rotated to a clockwise direction the lever 46 is checked at its clockwise rotated position as the check part 46a thereof is checked by a check part 57b of the lever 57, also when the fast forward and backward lever 51 is rotated to a clockwise or counterclockwise direction said lever 51 is checked at its clockwise or counterclockwise rotated position as the check part 51c or 51d thereof is checked by a check part 57c of the lever 57, and the armature rod 58a of the shut off solenoid 58 is slided to right side resisting the spring 60 as power is supplied to the solenoid 58 through an operation of the stop button 6, thus the lever 57 itself is slided to right side, then the checking of the lever 46 or the lever 51 by the check parts 57b or 57c will be released.

What is shown as 61 is a pinch roller pressure contacting solenoid, and 62 is a coupling rod coupled to an armature rod 61a of said solenoid 61, wherein an arm part at one side of a bell crank lever 63 which is so made as being rotated to a clockwise direction around a shaft 64 through a pinch roller pressure contacting spring 62a when the rods 61a and 62 are slided downward in the drawing as power is supplied to the solenoid 61, is engaged with a forward end of the rod 62. What is shown as 65 is a pinch roller pressure contacting lever which is pressed by a pin 63a planted on an arm at the other side of the lever 63 as the lever 63 is rotated to a clockwise direction, thereby being rotated to a counterclockwise direction around a shaft 66 to have the pinch roller 18 pressure contact with a capstan 116a, and has a slot part 65a having an introduction part with an open angle shape for receiving a shaft part of the pinch roller 18, and is rotatingly biased to a clockwise direction by a spring 67 which is spanned between itself and one of sliding guide pin 70 for a sliding plate 69 for controlling idler pressure contact and has by far stronger working power than that of the spring 17.

What is shown as 68 is a stopper pin to restrict said clockwise rotation of the lever 65. 72 is an idler supporting lever axially supporting a take up idler 73, which is usually driven rotatingly to a counterclockwise direction by the capstan motor 115 through a mechanism to be described later, at a forward end thereof, and said lever 72 is axially supported by a shaft 74 in a rotatable manner and is rotatingly biased by a spring 75 to a clockwise direction that is to a direction to have the idler 73 pressure contact with an outer circumference of the reel stand 29. Also, against said idler supporting lever 72, the above-mentioned sliding plate 69 for controlling pressure contact of idler has the bent part 69b at the tail end thereof pressed by the extended part 65a of the pinch roller pressure contacting lever 65, when said lever 65 is rotated to a clockwise direction that is to a direction to separate the pinch roller 18 from the capstan 116a, thereby being slided downwards resisting a bias spring 71 thereof, and at this time, the plate 69 presses an extended part 72a of the lever 72 by the bent part 69a at a forward end thereof to rotate the lever 72 to a counterclockwise direction resisting the spring 75, for separating the idler 73 from the take up reel stand 29.

What is shown as 76 is a tape tension detecting lever and has a tension detecting pin 76a at its forward end, and is axially supported by a shaft 77 in a rotatable manner, further it is rotatingly biased to a counterclockwise direction by a spring 78. What is shown as 79 is a back tension control lever for controlling a back tension of the feeding reel stand 28 in response to a tension detecting action of the tension detecting lever 76, and has an associating pin 79a, which comes in abut with a part of the detecting lever 76, at a forward end thereof, further is axially supported by the shaft 77 in a rotatable manner, and at the same time is rotatingly biased to a clockwise direction by a spring 80 which is weaker than the spring 78. And one end of a rod 83 being coupled to one end of a back tension adjusting belt 81 having a back tension adjusting member 82 of felt, etc. at an internal plane thereof is hung on a part of the lever 79. What is shown as 84 is a supporting plate fixedly supporting the other end of the belt 81, and is installed to the base plate 8 at its long hole 84a by a screw 85 in a manner its position is adjustable, and an initial adjustment of the back tension afforded by the belt 81 to the reel stand 28 is made possible by said position adjustment. Also, 86 is a stopper pin to restrict the counterclockwise rotation of both levers 76 and 79 mentioned above, and 87 is a stopper pin to restrict the clockwise rotation of the lever 79.

What is shown as 88 is a control lever to set the tension detecting lever 76 at an operating position shown in the drawing at the time of tape loading and to rotate the lever 76 to a clockwise direction resisting the spring 78 at the time of tape unloading to have the detecting pin 76a on a forward end of the lever 76 positioned within the tape cassette. The lever 88 is axially supported by a shaft 89 in a rotatable manner and is rotatingly biased to a clockwise direction by a spring 90, further has a follower roller 88a which comes in contact with the cam part 12c at the outer circumference of the loading ring 12 at a forward end of one of its arm parts, also a roller 88b which comes in contact with the cam part 76b of the lever 76 at a forward end of the other arm part thereof. Also, 91 is a stopper pin to restrict the clockwise rotation of the lever 88.

Next, details of the tape extracting means will be explained referring to FIGS. 4 to 8. The tape extracting means are provided in a pair in this example and have pins 97R, 97L being pertical respectively to the base plate 8 and pins 99R, 99L being inclined in correspondence to an inclination of the tape guide drum 9, and are so made that they are respectively inserted in a free manner into guide grooves (guide paths) 7a and 7b so perforated on the horizontal intermediate base plate 7 being parallel to the base plate 8 as coming approximately around the circumference of the guide drum 9 at base stands 92R, 92L thereof, and at the same time spring pieces 14a and 15a installed to spring supporting stands 14 and 15 on the loading rings 11 and 12 are made to engage with a part of the base stands 92R, 92L, thereby taking out the tape T housed in the tape cassette C out of the casette C following said guide grooves 7a and 7b along with the rotation of the loading rings 11 and 12, and shifting the tape T between the loading position at which the tape is wrapped about the outer circumference of the guide drum 9 in a tightly contacting manner and in a spiral form for 180 degree or more and the unloading position at which the tape T is housed within the opening C' of said cassette C.

That is, now details of an arrangement of the tape extracting means at right side will be explained referring to FIG. 5. In FIG. 5, what is shown as 92R is a base stand of said tape extracting means at right side and has a shape combining two cylindrical body parts 92Ra and 92Rb with a bridge part 92Rc, wherein these cylindrical body parts 92Ra, 92Rb are of same diameters and have dimensions which allow them to be inserted into the guide groove 7a in a free manner. A skate plate 93R and a pressing spring piece 94R are installed to the base stand 92R by screws 95Ra, 95Rb in such manner as vertically sandwiching the intermediate base plate 7, thereby holding the base stand 92R slidably along the guide groove 7a in a state that the stand 92R is dropped in the groove 7a. And under said state the spring piece 14a supported by the spring supporting stand 14 on the loading ring 11 engages with a recess 92Rd between the back cylindrical body parts 92Ra and 92Rb, thus the base stand 92R will be slided along the guide groove 7a along with a rotation of the loading ring 11. 96R is a shaft member having at its forward end a vertical pin 97R for restricting tape in its traverse direction which works as a tape extracting pin. The shaft member 96R goes through a notch part 93Ra of the skate member 93R and is pressedly inserted into a hole 92Re of the cylindrical body 92Ra of the stand 92R. 98R is an inclined pin supporting lever having an inclined pin 99R planted thereon with an inclination angle corresponding to the inclination angle of the tape guide drum 9, and is rotatably supported by the shaft member 96R, further is rotatingly biased by a spring 100R spanned between itself and an extruded part 92Rf of the base stand 92R to a counterclockwise direction that is a direction to separate the inclined pin 99R from the guide drum 9 in such manner that an extruded arm 98Ra thereof comes in abut with the extruded part 92Rf. Also said vertical pin 97R is threadedly installed at a forward end of the shaft member 96R by screws, etc. in such manner as allowing an adjustment thereof in a vertical direction for an adjustment of restriction in a traverse direction of the tape. And the inclination pin 99R is so planted on the supporting lever 98R as being positioned against the vertical pin 97R along with the guide groove 7a as shown in the drawing under a state that the supporting lever 98R is rotated to a counterclockwise direction until the extruded arm 98Ra of the supporting lever 98R comes in abut with the extruded part 92Rf of the base stand 92R under an action of the spring 100R.

Figure 6:
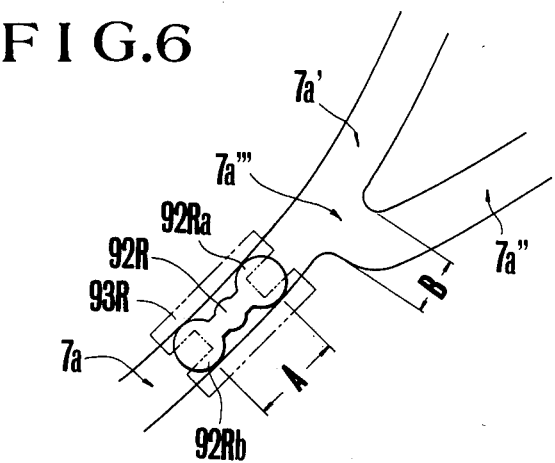
FIG. 6 is a diagram to explain a dimensional relationship of a guide groove against the tape extracting means at right side and a pinch roller, especially of a diverging point and the base plate at the tape extracting means.
Figure 7:
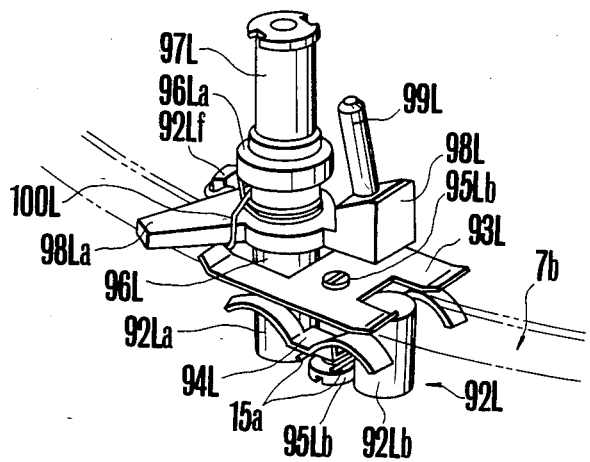
FIG. 7 is an oblique view to show details of an arrangement of tape extracting means at left side, showing a state after assembling as in FIG. 5(a).

While details of an arrangement of the tape extracting means at right side are as mentioned above, an arrangement of the tape extracting means at left side is symmetrical to the tape extracting means at right side except that a direction of the inclination of an inclined pin 99L thereof is different as shown in FIG. 7, therefore it is only shown in the drawing and explanation thereof will be omitted here. Here, suffix "R" added to identification numbers in FIGS. 4 to 8 indicates that a component belongs to the tape extracting means at right side, while "L" indicates that a component is of the tape extracting means at left side.

Now, referring back to FIG. 4, what are shown as 101R and 101L are V-shaped blocks to restrict the positions of the pertical pins 97R and 97L respectively at the tape loading completion position and have V-shaped recesses to receive large diameter parts 96Ra and 96La of each of the shaft members 96R and 96L, further are installed on block base stands 102R, 102L on the intermediate base plate 7 at positions corresponding to the loading completion positions in a manner that their respective positions are adjustable, and are fixed by screws 103R, 103L. 104R and 104L are inclined pin rotating levers having at their respective forward ends pins 104Ra, 104La which come in contact with the extruded arms 98Ra, 98La of the inclined pin supporting levers 98R, 98L at the tape loading completion position thereby rotating each of the levers 98R, 98L around the shaft members 96R, 96L respectively to a clockwise direction and a counterclockwise direction resisting respective biasing springs 100R, 100L so that the inclined pins 99R, 99L are rotated in such manner that they go around the guide drum 9, and are axially supported by shafts 105R, 105L planted on the intermediate base plate 7 in a manner that an adjustment of the rotation is made possible. The levers 104R, 104L can have positional adjustment of their pins 104Ra, 104Rb made by adjustment rotation of eccentric pins 106R, 106L engaging with slot parts 104Rb, 104Lb thereof. 107R, 107L are screws to fix the levers 104R, 104L after their positions are adjusted.

Figure 8:
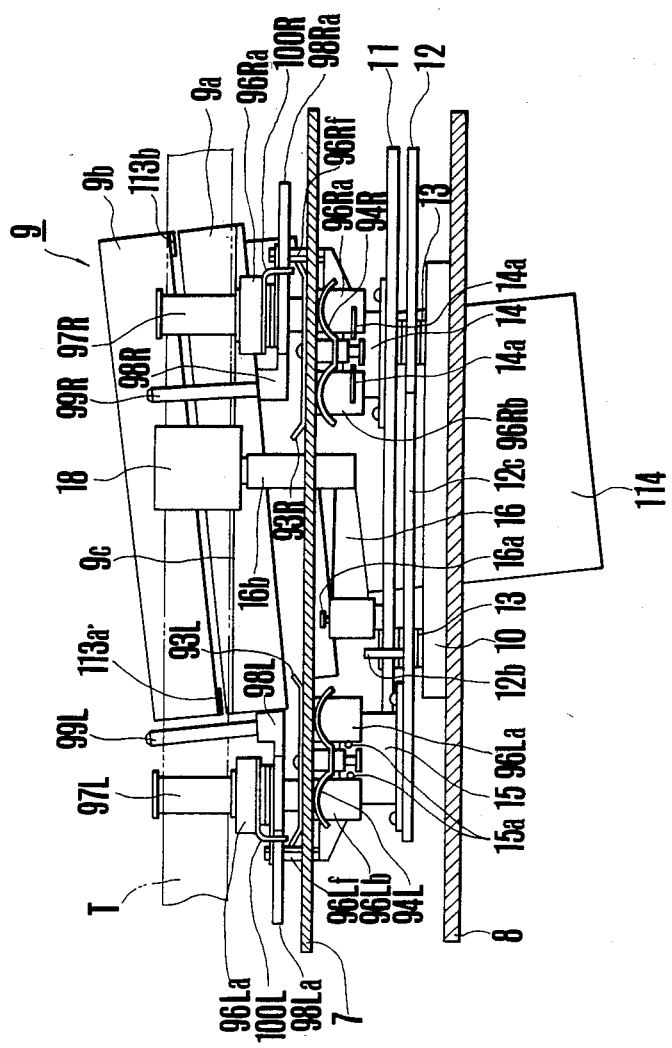
FIG. 8 is a view taken along the line A—A in FIG. 4 in a tape unloading state.

Now, explanations will be made on the guide groove 7a at the intermediate base plate 7 for the tape extracting means at right side. Said guide groove 7a is, as shown in the drawing, diverged at an intermediate position between a position corresponding to tape unloading and a position corresponding to tape loading into an exclusive path groove 7a' for the tape extracting means approximately coming around the circumference of the guide drum 9 and an exclusive path groove 7a" for the pinch roller being gradually separated from the guide drum 9 to outside and toward the capstan 116a. That is, here a pinch roller supporting rod 16b (shown in FIG. 8) at a forward end of the pinch roller arm 16 goes through the guide groove 7a from an under side of the intermediate base plate 7 at a position in rear of the base stand 92R of the tape extracting means at right side, and the pinch roller 18 is axially supported in a freely rotatable manner at a forward end of the rod 16b at an upper side of the base plate 7. Also, the base stands 92R is so made that an engaging length "A" thereof at both cylindrical body parts 92Ra, 92Rb thereof against the guide groove 7a and the exclusive path groove 7a' for the tape extracting means is larger than a width B of an opening at a diverging point 7a''' of the exclusive path groove 7a" for the pinch roller as shown in FIG. 6, and the spring piece 14a installed to the supporting stand 14 on the loading ring 11, engaging with the recess 92Rd of the base stand 92R, has its forward ends bent to be opened to outside as shown in FIGS. 2, 5(a), and 8, therefore the base stand 92R will not enter into the exclusive path groove 7a" for the pinch roller from the guide groove 7a as the loading ring 11 is rotated to a counterclockwise direction, instead it enters into the exclusive path groove 7a' for the tape extracting means, and resultantly it is shifted from the unloading position shown by two dotts chain line in FIG. 4 to the loading position shown by solid line being guided by the guide groove 7a and the exclusive path groove 7a' for the tape extracting means. On the other hand, since the pinch roller arm 16 is rotatingly biased to a clockwise direction by the spring 17 as explained in FIG. 2 the rod part 16b of the arm 16 will not enter into the exclusive path groove 7a' for the tape extracting means from the guide groove 7a at the diverging point 7a''', instead it enters into the exclusive path groove 7a" for the pinch roller and resultantly it is shifted being guided by the guide path 7a and the exclusive path groove 7a" for the pinch roller, thereby the pinch roller 18 is shifted from a non-operating position shown by two dotts chain line in FIG. 4 to a preparatory position (a position facing the capstan 116a without contacting the same) shown by one dot chain line.

Also, at this time at the position corresponding to loading, the large diameter part 96Ra of the shaft member 96R of the tape extracting means comes in contact with the V-shaped recess of the V-block 101R, determining the position of the vertical pin 97R, and at the same time the extruded arm 98Ra of the inclined pin supporting lever 98R comes in contact with the pin 104Ra of the inclined pin rotating lever 104R, rotating the lever 98R to a clockwise direction resisting the spring 100R, thereby rotating the inclined pin 99R in a manner as going around the outer circumference of the guide drum 9, and on the other hand the rod part 16b of the pinch roller arm 16 enters into the slot part 65a of the pinch roller pressure contacting lever 65 shown in FIG. 2 from the exclusive path groove 7a" for the pinch roller at around the terminal end of said path groove 7a".

Figure 4:
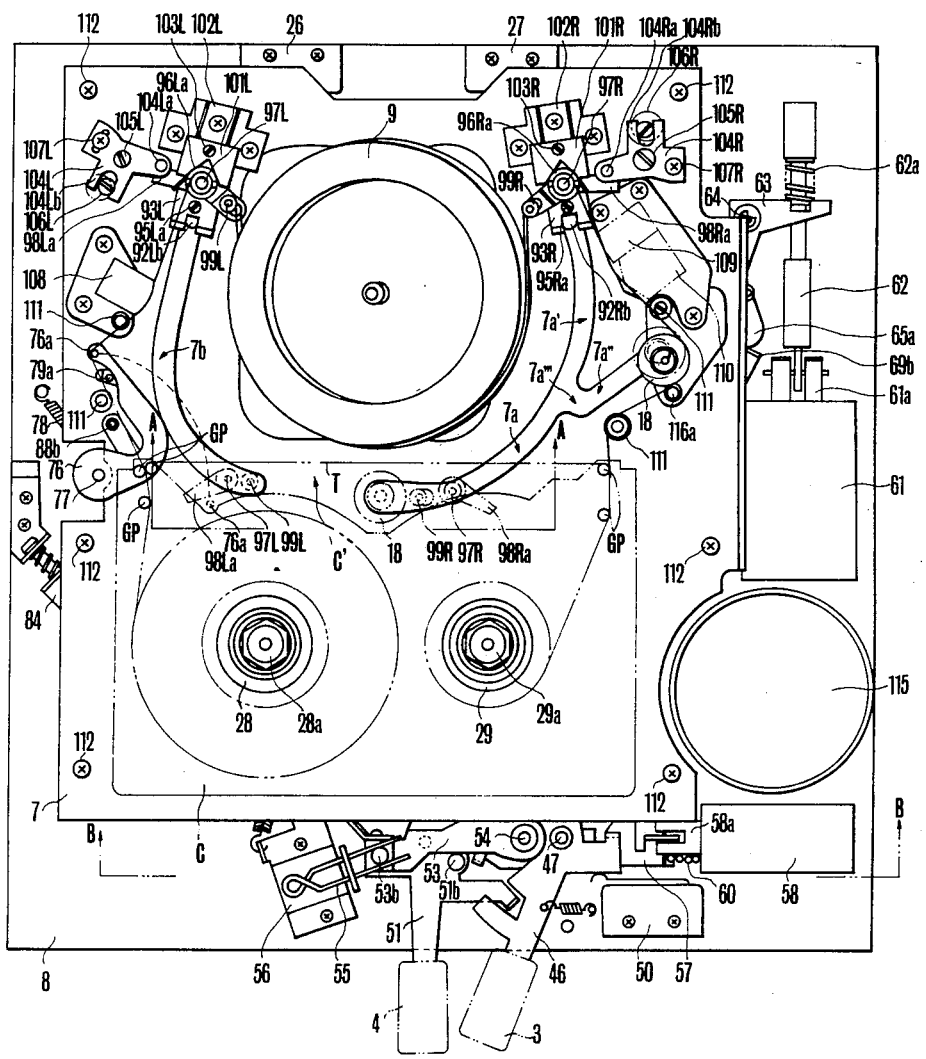
FIG. 4 is a drawing to show details of an arrangement on the intermediate base plate in which the tape guide drum and the intermediate base plate are assembled to the set up shown in FIG. 2, wherein the drawing shows a state a recording or reproducing is being done, as in FIG. 2.

Here, under a state that the slot part 65a of the pinch roller pressure contacting lever 65 receives the rod part 16b of the pinch roller arm 16, the armature rod 61a of the pinch roller pressure contacting solenoid 61 and the coupling rod 62 coupled thereto are slided downwards by supplying power to the solenoid 61, thereby rotating the bell crank lever 63 with pressing power of the spring 62a to a clockwise direction, then the lever 65 is rotated to a counterclockwise direction through the pin 63a of the lever 63 resisting the spring 67, thereby pressing the rod part 16b of the pinch roller arm 16 through the slot part 65a thereof, thus having the pinch roller 18 pressure contact with the capstan 116a as shown by solid line in FIG. 2 and FIG. 4. And at this time the pressure contacting power of the pinch roller 18 against the capstan 116a is obtained by the spring 62 on the coupling rod 62 working on the bell crank lever 63 and the spring 17 working on the pinch roller arm 16 (however in this case the working power of the spring 17 is very weak as it may be disregarded in comparing with that of the spring 62c).

Also in FIG. 4, what is shown as 108 is a magnetic head for total width erasing, 109 is a magnetic head for erasing audio and control tracks, and 110 is a magnetic head for recording and/or reproducing audio signal and control signal, while 111 are tape guide posts (or rollers) planted on the intermediate base plate 7. GP are tape guide pins (or rollers) within the tape cassette C, and 112 are screws to install the intermediate base plate 7 to the intermediate base plate holding stand 8a (shown in FIGS. 2 and 3), wherein said base plate 7 is installed in parallel to the base plate 8. Also in FIG. 8, the guide drum 9 consists of a fixed lower drum 9a having a tape lead 9c at its outer circumference and an upper rotating drum 9b which has magnetic heads 113a and 113b for recording and/or reproducing optical images facing to each other with 180 degree separation and is rotatingly driven by a rotating head motor 114. The guide drum 9 is fixedly supported by the guide drum supporting stand 10 in such manner that its axis line is inclined with a prescribed angle of inclination against a line vertical to the base plate 8, and the tape T is wrapped about the outer circumference of the guide drum 9 in a tightly contacting manner for 180 degree or more under a state as being pulled out in parallel by the above-mentioned tape extracting means that is in parallel to the base plate 8, and then, as known well has its magnetized plane scanned obliquely by the rotating heads 113a and 113b.

Now, explanations will be made on a control circuit for the loading motor 19 to drive the loading rings 11 and 12 referring to FIG. 10. Here it is supposed that the worm wheel 21 shown in FIG. 2 is driven to a counterclockwise rotation by a normal (positive) rotation of the motor 10 therefore the loading rings 11 and 12 are driven to a counterclockwise direction and a clockwise direction respectively through the gears 22 and 23, that is a tape loading direction, also the worm wheel 21 is driven to a clockwise direction by a reverse rotation therefore the loading rings 11 and 12 are driven to a clockwise direction and a counterclockwise direction respectively that is to the tape unloading direction.

Figure 10:
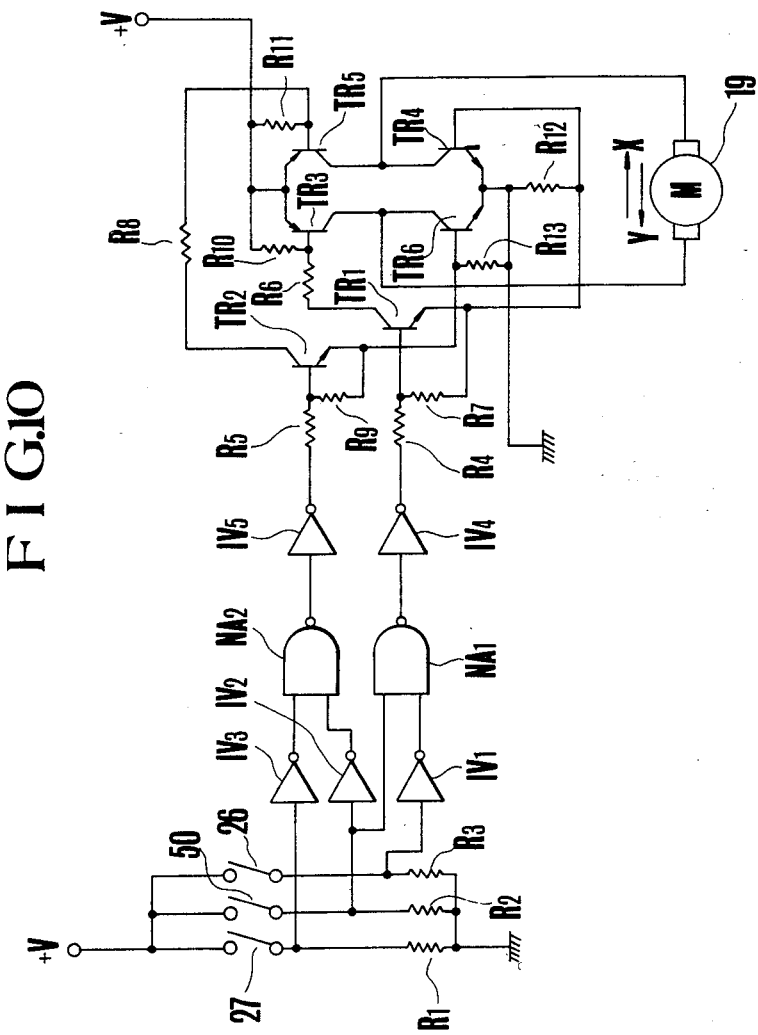
FIG. 10 is a circuit connection diagram showing an arrangement of a loading motor control circuit.

In FIG. 10, what are shown as 26, 27 and 50 are respectively the tape loading completion detecting switch, the tape unloading completion detecting switch and the play switch described before, and are connected to + side of a power source at one side and are grounded through resistances $R_1$, $R_2$ and $R_3$, respectively, and are so arranged that a high signal can be obtained by a switch on at connecting points with each of the resistances $R_1$, $R_2$, $R_3$, and a low signal can be obtained by a switch off. $IV_1$, $IV_2$ and $IV_3$ are inverters to inverse signals obtained by ON, OFF of the switches 26, 50, 27. $NA_1$ is a NAND.gate to receive an output of the inverter $IV_1$ and a signal obtained at a connecting point of the play switch 50 and the resistance $R_2$. $NA_2$ is a NAND.gate to receive outputs of the inverters $IV_2$ and $IV_3$. $IV_4$ and $IV_5$ are inverters to inverse outputs of the NAND.gates $NA_1$, $NA_2$. And outputs of these inverters $IV_4$, $IV_5$ are to be given to each of bases of npn switching transistors $TR_1$, $TR_2$ through resistances $R_4$, $R_5$. Here the collector side of the transistor $TR_1$ is connected to the base of a pnp switching transistor $TR_3$ through a resistance $R_6$, also its emitter side is connected to the base of a npn switching transistor $TR_4$ which is placed at a diagonal position against the transistor $TR_3$, and at the same time is connected to the base of itself through a resistance $R_7$.

On the other hand, the collector side of the transistor $TR_2$ is connected to the base of a pnp switching transistor $TR_5$ through a resistance $R_8$ and its emitter side is connected to the base of a npn switching transistor $TR_6$ placed at a diagonal position against the transistor $TR_5$, and at the same time is connected to the base of itself through a resistance $R_9$. Also emitter side and bases of the transistors $TR_3$ and $TR_5$ are connected to + side of a power source (the bases are through resistances $R_{10}$, $R_{11}$, respectively). Also the emitter side and the bases of the transistors $TR_4$ and $TR_6$ are grounded (the bases are through resistances $R_{12}$, $R_{13}$, respectively). And the loading motor 19 is insertedly connected between a connecting point of collectors of the transistors $TR_5$ and $TR_4$ and a connecting point of the collectors of the transistors $TR_3$ and $TR_6$.

When the play switch 50 is made ON by a play operation under a tape unloading completion state in the above-mentioned set up, an output of the NAND.gate $NA_1$ becomes low therefore an output of the inverter $IV_4$ becomes high while an output of the NAND.gate $NA_2$ is kept at high therefore that of the inverter $IV_5$ is kept at low. And as the transistor $TR_1$ is placed in a conductive state the transistors $TR_3$ and $TR_4$ are also placed in a conductive state and current flows to the loading motor 19 in a direction of an arrow X, rotating the motor 19 to a normal (positive) direction. And when the tape loading completion detecting switch 26 becomes ON at a loading completion position as mentioned above, an output of the NAND.gate $NA_1$ becomes high therefore an output of the inverter $IV_4$ becomes low, thus the transistor $TR_1$ is placed in a non-conductive state therefore the transistors $TR_3$ and $TR_4$ are both placed in a non-conductive state, thus the motor 19 is stopped.

On the other hand, when the play switch 50 is made OFF under said tape loading state, because the tape unloading completion detecting switch 27 has become high at this time, an output of the NAND.gate $NA_2$ becomes low therefore an output of the inverter $IV_5$ becomes high while an output of the NAND.gate $NA_1$ is kept at high therefore an output of the inverter $IV_4$ is kept at low, thereby placing the transistor $TR_2$ in a conductive state which in turn places the transistor $TR_5$ in a conductive state, flowing current to the loading motor 19 in a direction of an arrow Y, inversely rotating the motor 19. And when the tape unloading completion detecting switch 27 becomes ON at the tape unloading completion position as mentioned above, an output of the NAND.gate $NA_2$ becomes high therefore an output of the inverter $IV_5$ becomes low. Therefore the transistor $TR_2$ is placed in a non-conductive state, thus the transistors $TR_5$ and $TR_6$ are placed in a non-conductive state, and the motor 19 is stopped.

Thus the loading of the tape T to the guide drum 9 is done by a normal (positive) rotation of the loading motor 19, also the unloading of said tape T into the cassette is done by an inverse rotation of the motor 19.

Here at the time when the loading rings 11 and 12 are rotated to a counterclockwise direction and a clockwise direction that is to the loading direction, the large diameter parts 96Ra and 96La of the shaft members 96R and 96L at the tape extracting means come in contact with the V-shaped blocks 101R and 101L just a little before the loading restriction pin 11b on the loading ring 11 comes in abut with the stopper part 24a of the stopper arm 24 and the loading rings 11 and 12 are stopped. Therefore said large diameter parts 96Ra and 96La are passed against the V-shaped blocks 101R and 101L respectively by a pressing power generated by an elastic deformation of the spring pieces 14a and 15a by an extra rotation of the loading rings 11 and 12, thereby stopping and retaining, without any rattling (unstability), the vertical pins 97R and 97L at the loading completion position.

Figure 9:
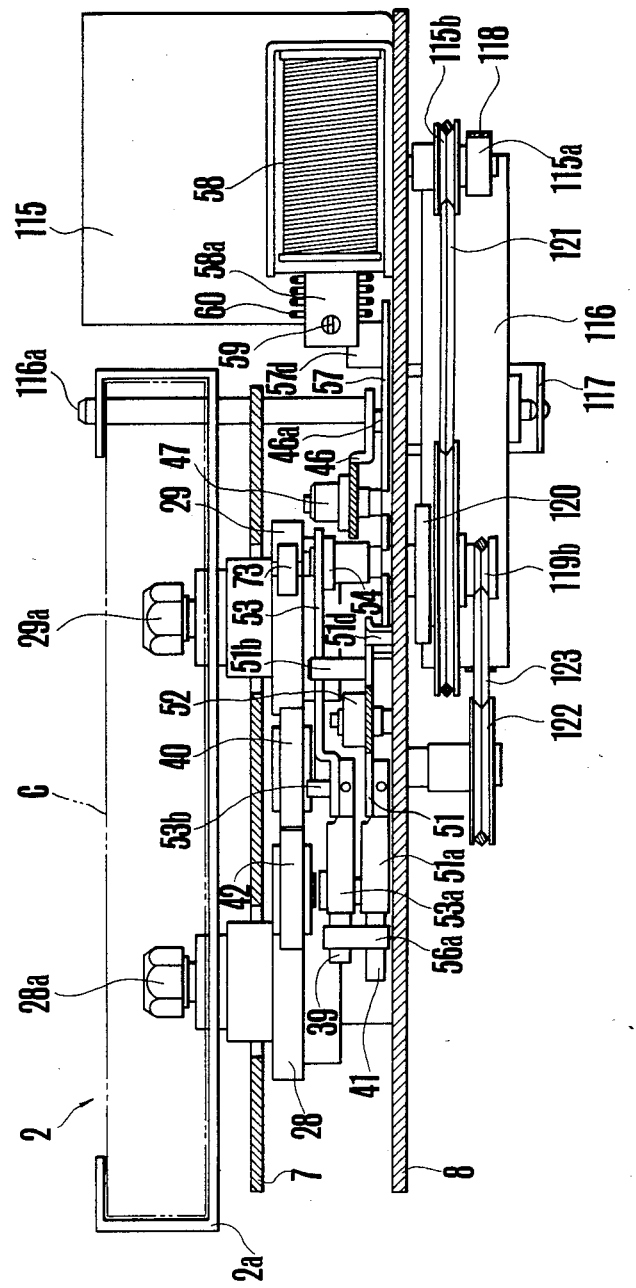
FIG. 9 is a view taken along the line B—B in FIG. 4.

Next an arrangement of the capstan and the reel driving system shall be explained referring to FIG. 9.

In FIG. 9, a capstan motor 115 has a flat pulley 115a for driving a flywheel and a V-shaped pulley 115b for driving reel at a forward end of an output shaft extended at a reverse side of the base plate 8. 116 is a flywheel axially supported in a freely rotatable manner by the base plate 8. And a rotation shaft of said wheel 116 is formed as a capstan 116a and is supported by a sheet spring 117 at its tail end, further is rotatingly driven by the flat pulley 115a through a flat belt 118 spanned between itself and the flat pulley 115a for driving flywheel on the output shaft of the motor 115. 119a is an idler pulley rotatingly driven by the V pulley 115b through a V-velt 121 spanned between itself and the V pulley 115b for driving reel on the output shaft of the motor 115, and the take up idler 73 on the supporting lever 72 explained in FIGS. 2 and 3 is coupled to said pulley 119a through a commonly known friction clutch 120. 119b is a V-pulley made integral with the idler pulley 119a. 122 is a V-pulley rotatingly driven by the pulley 119b through a V-belt 123 spanned between itself and the pulley 119b, and is coupled to the fast forwarding roller 40 explained in FIGS. 2 and 3 through a long hole not being shown in the drawing but perforated in the base plate 8. Said V-pulley 122 is so made as being integrally rotatable with the fast forwarding roller 40 along with a rotation of the fast forwarding roller stand 39.

Also, in FIGS. 2, 3, 4 and 9, what is shown as 28a is a feeding reel spindle, and 29a is a take up reel spindle, wherein these spindles engage with the feeding reel and the take up reel thereof respectively as the tape cassette stand 2a is lowered to a prescribed horizontal position (a position parallel to the base plate) after the tape cassette C is placed in the cassette housing part 2. And here, when the cassette stand 2a is lowered to the prescribed horizontal position after the cassette C is placed in the cassette housing part 2, as shown by two dotts chain line in FIG. 4, the vertical pins 97R, 97L of the tape extracting means at the tape unloading position, the pinch roller 18 and the detecting pin 76a of the tape tension detecting lever 76 are to enter into a reverse side of the tape T within the cassette C through the opening C' of the cassette C.

Next, explanations will be made on an action of a magnetic recording and/or reproducing apparatus with the above mentioned arrangement.

First, in a state the apparatus is stopped the loading rings 11 and 12 are in a state as being completely rotated to a clockwise direction and a counterclockwise direction respectively until the unloading restricting pin 11c on the loading ring 11 comes in abut with the stopper part 24a of the stopper arm 24 and is restricted thereby, therefore the switch put in lever 25 is rotated to a counterclockwise direction, thus the unloading completion detecting switch 27 is put in by the extended arm 25c of the lever 25, and at the same time the vertical pins 97R, 97L and the inclined pins 99R, 99L of the tape extracting means and the pinch roller 18 are positioned near the terminal end of the guide grooves 7a and 7b facing to the opening C' of the cassette C as shown by two dotts chain line in FIG. 4. And at this time the inclined pins 99R, 99L are in a state being rotated to a counterclockwise direction and a clockwise direction until the extended arms 98Ra, 98La of the inclined pin supporting levers 98R, 98L come in abut with the extended parts 92Rf, 92Lf of the base stands 92R, 92L in such manner that the inclined pins 99R, 99L move in approximately along with the guide grooves 7a, 7b against the vertical pins 97R, 97L by the springs 100R, 100L respectively.

Also at this time since the control lever 88 is rotated to a counterclockwise direction by an action of the cam part 12c at the outer circumference of the loading ring 12 resisting the spring 90, the tension detecting lever 76 is rotated to a clockwise direction resisting the spring 78, therefore the detecting pin 76a at a forward end thereof is placed at a position facing the opening C' of the cassette C as shown by two dotts chain line in FIG. 4. Also, along with it, the back tension control lever 79 is rotated to a clockwise direction until it comes in abut with the stopper pin 87 by the spring 80, and thereby the control power for an adjustment of the back tension for the feeding reel stand 28 has been completely loosened. Also at this time the brake control lever 34 and the tape slack absorbing control lever 37 are rotated to a clockwise direction by the control pin 12b on the loading ring 12 resisting the springs 35, 38, respectively and thereby the brake slide plate 30 is slided downwards under an action of the spring 32 to have the brake pad 31 thereof pressure contact with the outer circumferences of the feeding reel stand 28 and the take up reel stand 29, thus braking both of the reel stands 28, 29. Also the fast backwarding roller stand 41 is rotated to a counterclockwise direction by an action of the spring 45 until it comes in abut with the bent part 56a of the spring supporting stand 56, therefore the fast backwarding roller 42 is in a state being separated from both of the feeding reel stand 28 and the fast forwarding roller 40. Also, at this time the fast forwarding roller stand 39 is also rotated to a counterclockwise direction under an action of the spring 44 until it comes in abut with the bent part 56a of the spring supporting stand 56 and is restricted thereby, therefore the fast forwarding roller 40 is in a state being separated from the take up reel stand 29.

Further, under this state, since power is not supplied to the pinch roller pressure contacting solenoid 61, the pinch roller pressure contacting lever 65 rotates the bell crank lever 63 to a counterclockwise direction by an action of the spring 67, also rotates to a clockwise direction while it slides the idler pressure contacting control slide plate 69 downwards, and its slot part 65a is so positioned as being able to receive the rod part 16b of the pinch roller arm 16 near the terminal end of the exclusive path groove 7a" for the pinch roller in such state that the pinch roller 18 is slightly separated from the capstan 116a as shown by one dot chain line in FIG. 4. Also, on the other hand, said idler pressure contacting control slide plate 69 is slided downwards by the pinch roller pressure contacting lever 65, thereby rotating the idler supporting lever 72 to a counterclockwise direction resisting the spring 75, therefore the take up idler 73 is separated from the take up reel stand 29.

Now, when the tape cassette C is placed in the cassette housing part 2 under such state, said cassette C is lowered together with the cassette stand 2a to a prescribed position in such manner that it becomes parallel to the intermediate base plate 7, then the vertical pins 97R, 97L and the inclined pins 99R, 99L of the tape extracting means, and the pinch roller 18 as well as the tension detecting pin 76a of the tension detecting lever 76 enter into the cassette C through the opening C' of the cassette C, and are positioned at a reverse side of the tape T spanned within the opening C' as shown by two dotts chain line in FIG. 4.

When the power source switch operating lever 124 is operated to right side to put in a power source switch not being shown in the drawing under the above mentioned state, the rotating head motor 114 starts a rotation as known well, and the rotating heads 113a and 113b are rotatingly driven together with the rotating drum 9b of the guide drum 9, and at the same time the capstan motor 115 starts rotations then each one of the capstan 116a, the take up idler 73 and the fast forwarding roller 40 is rotatingly driven to a counterclockwise direction through the power transmitting system shown in FIG. 9, further, power will be supplied to a well known recording and/or reproducing circuit.

Next, as the play key 3 is operated to left side to rotate the play lever 46 to a clockwise direction resisting the spring 48, the play lever checking part 57b of the checking lever 57 engages with the engaging part 46a on the switch put in arm 46c thereof under an action of the spring 60 at a prescribed rotation position of the lever 46, thus checking the same at said prescribed rotation position, and at this time the bent part 46b at the forward end thereof comes to face the forward end of the arc shaped hook part 41b at the tail end of the fast backwarding roller stand 41 so that the clockwise rotation of said roller stand 41 may be blocked, and at the same time the notch part 46d thereof receives the bent part 51e at the forward end of the right hand extended arm of the fast backwarding lever 51, making the rotation of the lever 51 impossible, hence making the operation of the operating key 4 for fast forwarding and fast backwarding impossible, furthermore, the switch put in arm 46c thereof puts in the play switch 50. Then as said play switch 50 is put in the loading motor 19 starts its normal (positive) rotation by the control circuit explained in FIG. 10. And as said loading motor 19 starts its normal (positive) rotation, the loading rings 11 and 12 are rotated to a counterclockwise direction and a clockwise direction respectively as explained before, thereby the control pin 12b on the loading ring 12 is shifted to a clockwise direction, therefore the brake control lever 34 and the tape slack absorbing lever 37 are rotated to a counterclockwise direction under an action of the springs 35, 38 respectively, and the brake slide plate 30 is pulled upwards resisting the spring 32 thereof by the counterclockwise rotation of the brake control lever 34, then the pressure contact of the brake pad 31 thereof against the outer circumferences of the reel stands 28, 29 will be released thus releasing the braking of the reel stands 28, 29. Here, while the tape slack absorbing control lever 37 tends to rotate the fast backwarding roller stand 41 to a clockwise direction resisting the spring 45 as it is rotated to a counterclockwise direction by an action of the spring 38 thereof, the forward end of the arc shaped hook part 41b at the tail end of the roller stand 41 comes in abut with the bent part 46b at the forward end of the play lever 46 under this state, therefore the clockwise rotation of said roller stand 41 becomes impossible, therefore the fast backwarding roller 42 is retained in a state being separated from the feeding reel stand 28 and the fast forwarding roller 40.

Now, when the loading rigns 11 and 12 are rotated to a counterclockwise and a clockwise directions respectively, the tape extracting means at right side and the pinch roller 18 are shifted to a counterclockwise direction along the guide groove 7a and the tape extracting means at left side are shifted to a clockwise direction along the guide groove 7b, pulling out the tape T, respectively by the vertical pins 97R, 97L thereof. Here, the tape extracting means at right side will not enter into the exclusive path groove 7a" for pinch roller from the guide groove 7a at the diverging point 7a''' of the guide groove 7a by the above mentioned set up, instead it enters into the exclusive path groove 7a' for tape extracting means and is further shifted along said path groove 7a'. On the other hand, since the pinch roller arm 16 is rotatingly biased to a clockwise direction by the spring 17 and the rod part 16b thereof will not enter into the exclusive path groove 7a' for tape extracting means at the diverging point 7a''' of the guide groove 7a instead it enters into the exclusive path groove 7a" for pinch roller, the pinch roller 18 is shifted along the exclusive path groove 7a" for pinch roller from the guide groove 7a after the diverging point 7a''' thereof.

And the extruded arms 98Ra, 98La of the inclined pin supporting levers 98R, 98L at each of the tape extracting means come in abut with the pins 104Ra, 104La of the inclined pin rotating levers 104R, 104L, respectively a little before the loading restricting pin 11b on the loading ring 11 comes in abut with the stopper part 24a of the stopper arm 24, therefore said levers 98R. 98L are rotated to a clockwise direction and a counterclockwise direction respectively resisting the springs 100R, 100L, and by this the inclined pins 99R, 99L are respectively rotated to a clockwise direction and a counterclockwise direction in a manner as coming along the outer circumference of the guide drum 9 so that the tape T is wrapped about the outer circumference of the guide drum 9 for an extent of 180 degree or more in a tightly contacting manner having the tape plane come along the inclination of the guide drum 9 at the tape feed in part and the tape take out part for the guide drum 9, and at this time the large diameter parts 96Ra, 96La of the shaft members 96R, 96L at each of the tape extracting means come in abut with the V-shaped recesses of the V-blocks 101R, 101L, respectively, thereby restricting the positions of the vertical pins 97R, 97L.

Here, as has been explained before, the rotating position of each of the inclined pins 99R, 99L at this time is adjustable by adjusting the rotations of the inclined pin rotation levers 104R, 104L respectively by the eccentric pins 106R, 106L thereof, and by this such fine adjustments as an adjustment of an angle of wrapping the tape T about the guide drum 9 in a tightly contacting manner, and an adjustment of running of the tape T against the tape lead 9c of the lower fixed drum 9a can be made precisely and easily, also the stopping positions of the vertical pins 97R, 97L can be adjusted by adjusting the positions of the V-blocks 101R, 101L to front and to the rear on the block base stands 102R, 102L.

And the inclined pins 99R, 99L are rotated in a manner as going around the guide drum 9 respectively as mentioned above and at the same time, after the shaft members 96R, 96L come in abut with the V-blocks 101R, 101L, the loading rings 11 and 12 make a small excessive rotation, then thereafter the loading restriction pin 11b on the loading ring 11 comes in abut with the stopper arm 24 and is restricted thereby, and the vertical pins 97R, 97L are stationarily retained at their respective tape loading completion positions by the pressure contacting power by elastic deformation of the spring pieces 14a, 15a accompanied by said excessive rotation at this time. Also, since the rod part 16b of the pinch roller arm 16 enters into the slot part 65a of the pinch roller pressure contacting lever 65 from the exclusive path groove 7a", the pinch roller 18 at this time faces the capstan 116a with a small space therefrom and sandwiching the tape therebetween as shown by one dot chain line shown in FIG. 4.

Also, when the loading ring 12 rotates at this time to a clockwise direction the control lever 88 rotates to a clockwise direction following the cam part 12c at the outer circumference of the loading ring 12, and by this the tension detecting lever 76 has its restriction by the roller 88b at the forward end of said control lever 88 released, therefore it rotates to a counterclockwise direction by an action of the spring 78, placing the tape T over the pin 76a thereof as shown in FIG. 4. Also, along with the counterclockwise rotation of said tension detecting lever 76 at this time, the tension control lever 79 has its pin 79a pushed by a part of the tension detecting lever 76, thus it is rotated to a counterclockwise direction resisting the spring 80, then the tension adjusting belt 81 is pulled thereby, thus the tension adjusting member 82 at an internal plane thereof is made to pressure contact with the outer circumference of the feeding reel stand 28, affording such back tension as corresponding to the tape tension at this time to said reel stand 28.

Now, after said tape loading action is done, when the loading restricting pin 11b on the loading ring 11 comes in abut with the stopper part 24a of the stopper arm 24 and is restricted thereby, the switch put in lever 25 is rotated to a clockwise direction by said pin 11b, therefore the unloading detection switch 27 becomes OFF and on the other hand the loading completion detecting switch 26 is put in by the extended arm 25b thereof, and by this the loading motor 19 is stopped by the control circuit explained in FIG. 10.

On the other hand, when said loading completion detecting switch 26 is put in, power is supplied to the pinch roller pressure contacting solenoid 61 and the armature rod 61a thereof and the coupling rod 62 being coupled thereto are slided downwards, then the bell crank lever 63 is rotated to a clockwise direction through the spring 62a, thereby the pinch roller pressure contacting lever 65 is rotated to a counterclockwise direction resisting the spring 67, thus the pinch roller 18 is made to pressure contact with the capstan 116a sandwiching the tape T therebetween by an action of the spring 62a as shown by solid line in FIG. 4, also the downward pressing against the idler pressure contacting control slide plate 69 is released by the counterclockwise rotation of the pinch roller pressure contacting lever 65 at this time, therefore the idler supporting lever 72 rotates to a clockwise direction by a working power of the spring 75 pushing the slide plate 69 upwards and has the take up idler 73 pressure contact with the outer circumference of the take up reel stand 29, thus the running of the tape by the capstan 116a and the pinch roller 18 and the taking up of the tape by the clockwise rotation of the take up reel stand 29 are started and the tape T is made to run along the running path outside the recording and/or reproducing cassette through the guide drum 9, thus making the recording or reproduction. That is, if the recording button 5 is operated at this time, a recording and/or reproducing circuit not being shown in the drawing is placed in a recording mode making a recording and when it is not operated the circuit is placed in a reproducing mode, making a reproduction.

Next, explanations will be made on a stopping action during said recording or reproducing operation. Now, if the stopping button 6 is operated during the recording or reproducing operation, a shut off switch not being shown in the drawing is put in thereby and power is supplied to the shut off solenoid 58 and thereby the armature rod 58a thereof is slided to right side resisting the spring 60, therefore the checking lever 57 is slided to the same direction, and at this time since the checking of the engaging part 46a of the play lever 46 by the play lever checking part 57b of the checking lever 57 is released the play lever 46 is rotated to a counterclockwise direction until it comes in abut with the stopper pin 49 and is restricted thereby by the spring 48, and is returned to a non-operating position. When said play lever 46 returns to its non-operating position, the play switch 50 becomes OFF therealong, therefore the loading motor 19 will be reversed by the control circuit explained by FIG. 10, and thereby the loading rings 11 and 12 are rotated to a clockwise direction and a counterclockwise direction respectively. And first, as the loading restriction pin 11b comes off the stopper part 24a of the stopper arm 24 by the clockwise rotation of the loading ring 11 at this time, the pressing against the switch put in lever 25 is thereby released, therefore the loading completion detecting switch 26 becomes OFF thereby cutting the power supply to the pinch roller pressure contacting solenoid 61, therefore the pinch roller pressure contacting lever 65 rotates the bell crank lever 63 to a counterclockwise direction by an action of the spring 67 therefore slide the coupling rod 62 and the armature rod 61a upwards and at the same time it is rotated to a clockwise direction sliding the idler pressure contacting control slide plate 69 downwards to separate the pinch roller 18 from the capstan 116a, also at this time the slide plate 69 rotates the idler supporting lever 72 to a clockwise direction resisting the spring 75 thereof by its downward sliding, separating the take up idler 73 from the take up reel stand 29, thus the running of the tape is stopped. On the other hand, when the loading rings 11 and 12 are rotated to a clockwise direction and a counterclockwise direction respectively, the pinch roller 18 is shifted to a clockwise direction along the exclusive path groove 7a″ for pinch roller and the guide groove 7a and the tape extracting means at right side are also shifted to a clockwise direction along the exclusive path groove 7a′ for tape extracting means and the guide groove 7a. On the other hand, the tape extracting means at left side is shifted to a counterclockwise direction along the guide groove 7b, also at this time the control lever 88 is rotated to a counterclockwise direction resisting the spring 90 by the cam part 12c of the loading ring 12, therefore the tension detecting lever 76 is rotated to a clockwise direction resisting its spring 78 through the roller 88b at the forward end thereof, also along with the same the tension control lever 79 is rotated to a clockwise direction until it comes in abut with the stopper pin 87 by the spring 80 thereof and is restricted thereby.

Also on the other hand, when the play lever 46 returns its non-operating position, the bent part 46b at the forward end thereof at this time comes off the forward end of the arc shaped hook part 41b at the tail end of the fast backwarding roller stand 41, therefore the tape slack absorbing control lever 37 rotates the fast backwarding roller stand 41 to a clockwise direction resisting the spring 45 thereof by an action of the spring 38, and has the fast backwarding roller 42 pressure contact with the feeding reel stand 28 and the fast forwarding roller 40 by the prescribed pressure contacting power by said spring 38, thereby affording lighter taking up torque to the feeding reel stand 28 than that of the fast backwarding of tape, therefore the feeding reel stand 28 is rotated to a counterclockwise direction, thus absorbing the slack of the tape T acompanied by the tape unloading, thus the running path of the tape T will be that within the cassette.

When the tape unloading is done by the above-mentioned process and both tape extracting means at left and right sides, the pinch roller 18 and the tension detecting pin 76a come to the unloading positions shown by two dotts chain line in FIG. 4, the control pin 12b on the loading ring 12 at this time comes in abut with the extended arms 34b, 37b of the brake control lever 34 and the tape slack absorbing control lever 37 to rotate these levers 34 and 37 to a clockwise direction resisting the springs 35, 38 thereof respectively, thereby the brake slide plate 30 slides downwards by an action of the spring 32 to have its brake pad 31 pressure contact with the outer circumferences of both reel stands 28, 29, thus braking both reel stands 28, 29, and at the same time the fast backwarding roller stand 41 rotates to a counterclockwise direction by the spring 45, separating the fast backwarding roller 42 from the feeding reel stand 28 and the fast forwarding roller 40, thus completing the tape unloading.

Next, explanations will be made on the action for tape fast forwarding and fast backwarding. When the tape fast forwarding is done, the operating key 4 needs to be operated to right side, while the key 4 needs to be operated to left side when the tape fast backwarding is done. And now when the operating key 4 is operated to right side for making a fast forwarding of tape under the above-mentioned tape unloading completion state, the lever 51 for fast forwarding and fast backwarding is rotated to a counterclockwise direction, and then the fast forwarding lever 53 is rotated by the pin 51b thereof to a counterclockwise direction resisting the neutral retention spring 55, and at this time the fast forwarding roller stand 39 is rotated to a clockwise direction by the spring piece 53a at the forward end thereof resisting the spring 44, thereby having the fast forwarding roller 40 pressure contact with the outer circumference of the take up reel stand 29, thus the take up reel stand 29 is rotated with a high speed to a clockwise direction for making the fast forwarding of the tape T along the running path within the cassette. And at this time since the engaging part 51d of the lever 51 engages with the checking part 57c of the checking lever 57 at a prescribed rotation position in a counterclockwise direction of the lever 51, the lever 51 is checked at the fast forwarding operation position. Therefore, in order to stop the tape fast forwarding, power is supplied to the shut off solenoid 58 by operating the stopping button 6 to slide the checking lever 57 to right side thereby releasing the checking of the lever 51 at the fast forwarding operation position.

On the other hand, when the operating key 4 is operated to left side for making a fast backwarding of tape under the above-mentioned tape unloading completion state, the lever 51 for fast forwarding and fast backwarding is rotated to a clockwise direction thereby, and at this time the fast backwarding roller stand 41 is rotated to a clockwise direction through the spring piece 51a on the extended arm thereof resisting the spring 45 to have the fast backwarding roller 42 pressure contact with the feeding reel stand 28 and the fast forwarding roller 40 by a stronger power than the working power of the spring 38 spanned on the tape slack absorbing control lever 37, thus a wind up torque stronger than that at the time of absorbing tape slack at the tape unloading is afforded to the feeding reel stand 28, thus rotating said reel stand with high speed to a counterclockwise direction, for making the fast backwarding of the tape T along the running path within the cassette. Also at this time the lever 51 is checked at the fast backwarding operation position as the engaging part 51c thereof engages with the checking part 57c of the checking lever 57 at the prescribed rotation position in a clockwise direction thereof, therefore, in order to stop the fast backwarding of tape, power is supplied to the shut off solenoid 58 by operating the stop button 6 to slide the checking lever 57 to right side thereby releasing the checking of the lever 51 at the fast backwarding operation position.

Now, as has been explained above the present invention relates to a magnetic recording and/or reproducing apparatus with an arrangement such as mentioned above, that is a magnetic recording and/or reproducing apparatus in which a magnetic tape housed within a cassette being loaded into the apparatus is pulled out of the cassette by tape extracting means and is wrapped about an outercircumference of a guide drum having a rotary magnetic head in a tightly contacting manner for a prescribed angle, then said tape is driven to run the same by a capstan and a pinch roller under said state, for making a recording and/or reproduction of optical images, and has such arrangement that the tape running capstan is placed at a position outside of the cassette, and the pinch roller is placed at an inside of the tape within the cassette together with the tape extracting means in a state before the tape is extracted so that said pinch roller is shifted along the guide path which is common with the tape extracting means as the tape is pulled out, and at the same time said guide path is divided at a position between a position corresponding to tape unloading and a position corresponding to tape loading into an exclusive path for tape extracting means and an exclusive path for pinch roller being different from the former path, then after said diverging point said tape is wrapped about the guide drum in a tightly contacting manner by shifting the tape extracting means along the exclusive path for tape extracting means, also the pinch roller is shifted along the exclusive path for pinch roller thereby having the same face the capstan positioned at an outside of the cassette at a terminal position of said shifting. And a magnetic recording and/or reproducing apparatus with the above-mentioned set up is very effective in making a size of a cassette small and in reducing a size of a total apparatus, further it is an advantageous set up which allows a satisfactory driving of a tape to run the same without any unreasonable strain in spite of its small size, thus great advantages can be obtained in this kind of magnetic recording and/or reproducing apparatus.

Furthermore, the present invention relates, as has been explained above in detail, to a magnetic recording and/or reproducing apparatus with an arrangement explained in the beginning hereof, that is a magnetic recording and/or reproducing apparatus which has an arrangement that a magnetic tape housed in a cassette being loaded in said apparatus is pulled out from said cassette in approximately parallel to a cassette supporting plane by tape extracting means having pins approximately vertical relatively against the cassette supporting plane and pins relatively inclined against the same, and is wrapped about an outer circumference of a guide drum which has a rotary magnetic head and is provided in a manner as being inclined with a prescribed angle relatively against the cassette supporting plane in a tightly contacting manner for a prescribed angle in a state being approximately parallel relatively to the cassette supporting plane, for making a recording and/or reproducing of optical images, and has such arrangement that said inclined pins are supportad in a manner being rotatable relatively to the vertical pins and at the same time the inclined pins are so positioned as approximately coming along the shifting path of the tape extracting means relatively against the vertical pins until the tape extracting means reach its tape loading position, and said inclined pins are rotated to the guide drum side relatively against the vertical pins at a tape loading position for making it to come approximately along the guide drum, wherein a space around the guide drum needed for shifting of the tape extracting means in a magnetic recording and/or reproducing apparatus with the above-mentioned arrangement can be made very small, and by this such verious elements to be positioned near the guide drum as the above-mentioned fixed head, etc., can be positioned closer to the guide drum, thus useful advantages that it can make great contributions in making a size of total apparatus smaller can be obtained.

Here an arrangement disclosed as an example, that is an arrangement that the inclined pins are supported in a rotatable manner relatively against the vertical pins by a rotatable supporting member, and at the same time said supporting member is biased to a prescribed direction by a spring member until its position is restricted, thereby positioning said inclined pins so as to come approximately along a shifting path of the tape extracting means relatively against the vertical pins until the tape extracting means reach the tape loading position, and said supporting member is rotated resisting said spring member, having a part of said supporting member engage with an engaging member at the tape loading position, thereby rotating the inclined pins to the guide drum side relatively against the vertical pins, further at this time the engaging position of said engaging member is made adjustable so that an adjustment of a rotating position of the inclined pins can be made by adjusting said engaging position, is very advantageous in making a positional adjustment of the inclined pins against the guide drum at the tape loading position.

And furthermore, a magnetic recording and/or reproducing apparatus of the present invention, as has been explained above in detail, has at least two kinds of running paths of a magnetic tape and a rotating body for a high speed running of tape making a high speed rotation is made to pressure contact with a rotating body for driving a tape reel in a state the magnetic tape is at one of the running paths for rotating said rotating body for driving the tape reel, thereby making a high speed driving to run the magnetic tape, also the rotating body for driving the tape reel is made to pressure contact with the rotating body for high speed running of tape also at a time the running path of the magnetic tape is changed from a longer running path to a shorter one for rotating said rotating body for driving the tape reel, thereby absorbing a slack of the magnetic tape generated by a change in the running path at this time, and at the same time the pressure contacting power of the rotating body for high speed running of tape against the rotating body for driving the tape reel is made weaker than the pressure contacting power at the time of high speed driving to run the tape, and by this a magnetic recording and/or reproducing apparatus, which is so made that at least two kinds of running paths for a magnetic tape are provided and a slack of the tape generated by a change in a running path when said running path is changed from a longer one to a shorter one is absorbed especially by utilizing a driving system for high speed running of tape for fast forwarding and fast backwarding, etc. of tape, can absorb the slack of tape accompanied by a change in a running path of tape by a very simple arrangement without any unreasonable strain or stress and yet the apparatus can be free from such disadvantages as a complication of an arrangement of a reel driving mechanism or a complication in an arrangement of a control circuit for its driving motor, thus the invention is quite useful in this kind of apparatus, greatly contributing to reduce a size of a total apparatus.

Also, while as an example a case is shown that a tape fast backwarding roller as rotating body for high speed running tape is made to pressure contact with a tape feeding reel stand with a weaker pressure contacting power than that at the time of tape fast backwarding to rotate said feeding reel stand with a weaker torque to a tape taking up direction, thereby absorbing a slack of tape at the time of tape unloading, the apparatus may be so made that a tape fast forwarding roller as a rotating body for high speed running of tape is made to pressure contact with a tape take up reel stand with a weaker pressure contacting power than that at the time of tape fast forwarding, for rotating said take up reel stand with a light torque to a take up direction thereby absorbing a slack of tape at the time of tape unloading, or the apparatus can be also so made that these tape fast forwarding roller and tape fast backwarding roller are made to pressure contact with a tape take up reel stand and a tape feeding reel stand respectively with a weaker pressure contacting power for rotating each of the reel stands with a light torque to a tape take up direction, thereby absorbing a slack of tape at the time of tape unloading, as may be readily understood.

That is, explanations will be made on such modified examples based on an arrangement of the example shown in the drawings. First, for the former case, in FIGS. 2 and 3, the fast forwarding roller stand 39, supporting the fast forwarding roller 40, may be made as lever means having such engaging part (41a) against the tape slack absorbing control lever 37 and an engaging part (41b) against the play lever 46 as in the fast backwarding roller stand 41 shown in the drawing, and on the other hand said fast backwarding roller stand 41 may be made as lever means without such engaging parts (41a, 41b) as in the fast forwarding roller stand 39 shown in the drawing, wherein the fast forwarding roller stand 39 is rotated to a clockwise direction resisting the spring 44 therefor through the lever 37 by the spring 38 spanned between itself and the control lever 37 at a time of tape unloading, and by this the fast forwarding roller stand 40 is made to pressure contact with the tape take up reel stand 29 with weaker pressure contacting power than that at a tape fast forwarding mode. And in the latter case, the fast backwarding roller stand 41 may be retained as in the arrangement shown in the drawing, and on the other hand, the fast forwarding roller stand 39 may be modified as mentioned above, wherein each of these roller stands 39 and 41 is rotated both to a clockwise direction resisting respective springs 44, 45 through the lever 37 by the spring 38 hung on the control lever 37 at a time of tape unloading, so that the fast forwarding roller 40 is made to pressure contact with the tape take up reel stand 29 with a weaker pressure contacting power by the spring 38 than that at a tape fast forwarding mode, and at the same time the fast backwarding roller 42 is made to pressure contact with the fast forwarding roller 40 and the tape feeding reel stand 28 by a weaker pressure contacting power by the spring 38 than that at a tape fast backwarding mode.

Said modified examples can be, as have been explained above, easily realized in view of the arrangement of the examples, thus the present invention is not limited to the example shown in the drawing, instead the present invention can have various modifications within a scope of its purport.

What is claimed is:

1. A recording and/or reproducing apparatus for use with a record bearing tape housed in a cassette, comprising:
   a guide drum forming a generally cylindrical surface having at least one rotary head;

loading means for drawing the tape from the cassette and bringing the tape into contact with the surface of said guide drum, said loading means including first and second extracting members for drawing out the tape while in contact with the tape;

a first path for passage of said first extracting member;

a second path for passage of said second extracting member; and said first and said second paths partially overlapping each other, and said first and said second extracting members being arranged for passing the overlapping portion of the paths one after the other during loading.

2. A recording and/or reproducing apparatus according to claim 1, further comprising a capstan for driving the tape; wherein said second extracting member includes a pinch roller for transporting the tape by the cooperation with said capstan.

3. A recording and/or reproducing apparatus according to claim 1, wherein the head is a magnetic head and the tape is a magnetic tape.

4. A recording and/or reproducing apparatus according to claim 1, wherein said first extracting member includes a vertical pin and an inclined pin rotatably arranged about the vertical pin.

5. A recording and/or reproducing apparatus according to claim 4, wherein said loading means further includes a third extracting member having a vertical pin and an inclined pin rotatably arranged about the vertical pin.

6. A recording and/or reproducing apparatus according to claim 1, further comprising driving means for driving the tape fast forward and/or backward, said driving means being adapted to wind up the tape sufficiently fast to prevent slack in the tape when said first and second extracting members return to their intial positions.

7. A recording and/or reproducing apparatus according to claim 4 or 5, wherein said inclined pin is adapted to rotate in such a direction that the tape is further wrapped around said guide drum after the completion of the extraction of the tape.

8. A recording and/or reproducing apparatus for use with a record bearing tape housed in a cassette and wound about at least one reel, comprising:

a guide drum forming a generally cylindrical surface and having at least one rotary head;

loading and unloading means for drawing the tape from the cassette to load the tape on said guide drum and for unloading the tape from the guide drum;

reel driving means for rotating the reel of the cassette so as to rapidly feed the tape forward and/or backward; and control means for transmitting the driving force of the reel driving means to the reel when the tape is unloaded from said guide drum by said loading and unloading means, said control means being arranged for transmitting to the reel a driving force weaker than that applied at the time of the rapid forward feed and/or backward feed when the tape is unloaded by the loading and unloading means.

9. A recording and/or reproducing apparatus for use with a record bearing tape housed in a cassette, comprising:

a guide drum forming a generally cylindrical surface and having at least one rotary head;

loading means for extracting the tape from the cassette and bringing the tape into contact with said drum, said loading means including at least a vertical pin and an inclined pin movable about the vertical pin; and means for moving the inclined pin after the loading means has extracted the tape from the cassette in a direction to increase the contact area of the tape to said guide drum.

10. A recording and/or reproducing apparatus according to claim 9, wherein said loading means includes pairs of vertical pins and inclined pins.

11. A recording and/or reproducing apparatus according to claim 9, further comprising means for driving the tape fast-forward and or backward, said driving means being adapted to wind up the tape fast enough to prevent slack in the tape when the loading means return to an initial position.

12. A recording and/or reproducing apparatus according to claim 9 or 10, wherein said loading means further includes a rotatable supporting member, for rotatably supporting each inclined pin with respect to each vertical pin, a spring member biasing said supporting member in a prescribed direction, and a restricting member for restricting said supporting member against said spring member.

13. A magnetic recording and/or reproducing apparatus for use with a magnetic tape housed in a tape cassette, comprising:

recording and/or reproducing means including at least one magnetic head;

first, second and third extracting means for extracting the tape from the cassette and for placing the tape with respect to said recording and/or reproducing means; and first, second and third paths respectively for the passages of said first, said second and said third extracting means, said first and said second paths partially overlapping each other, and said first and said second extracting means being arranged for passing the overlapping portion of the first and the second paths one after the other during extracting.

14. An apparatus according to claim 13, further comprising a capstan for driving the extracted tape;

wherein said second extracting means includes a pinch roller for transporting the extracted tape by the cooperation with said capstan.

15. An apparatus according to claim 13 or 14, wherein said magnetic head is rotatable about an axis and said recording and/or reproducing means further includes a guide drum assembly for guiding the tape with respect to the head;

said first and said third extracting means being arranged to partially wrap the tape around said guide drum assembly.

16. An apparatus according to claim 15, wherein each of said first and said third extracting means includes a vertical pin and an inclined pin rotatably arranged about the vertical pin.

17. An apparatus according to claim 16, wherein said rotation axis of said magnetic head and said guide drum assembly are inclined with respect to the cassette; and each of said inclined pins is adapted to rotate in such a direction that the tape is further wrapped around said guide drum assembly after the completion of the extraction of the tape.

18. A magnetic recording and/or reproducing apparatus for use with a magnetic tape housed in a tape cassette, comprising:

at least one magnetic head for recording signals on and/or reproducing recorded signals from the tape, said head being rotatable about an axis which is inclined with respect to the cassette;

a guide drum assembly for guiding the tape with respect to said;

a pair of wrapping means for extracting the tape from the cassette and for partially wrapping the extracted tape around said guide drum assembly, said pair of wrapping means having respective moving paths leaving the guide drum assembly therebetween and each wrapping means including a vertical pin and an inclined pin movable about the vertical pin; and means for moving each of said inclined pins of said pair of wrapping means in a direction to increase the wrapping area of the tape to said guide drum assembly after the wrapping means have extracted the tape from the cassette.

19. An apparatus according to claim 35, wherein said guide drum assembly is inclined with respect to the cassette so that a center axis of the assembly aligns with the rotation axis of said head; and said moving means is arranged to move each inclined pin so that each inclined pin substantially aligns with said guide drum assembly.

20. An apparatus according to claim 18 or 19, further comprising:

means for fixing each of said vertical pins of said pair of wrapping means when each of the wrapping means has extracted the tape from the cassette.

21. An apparatus according to claim 20, wherein each of said wrapping means further includes:

a rotatable supporting member for rotatably supporting said inclined pin with respect to said vertical pin; p1 a spring member for urging said supporting member in a predetermined direction; and a restriction member for restricting said supporting member against said spring member.

22. An apparatus according to claim 21, wherein said moving means is arranged to rotate each supporting member in a direction opposite to said predetermined direction against said spring member.

* * * * *